US012784630B2

(12) United States Patent
Couleaud et al.

(10) Patent No.: US 12,784,630 B2
(45) Date of Patent: Nov. 3, 2026

(54) SYSTEM AND METHODS TO PROGRAM ACTIVE VEHICLE PAINT SURFACES

(71) Applicant: Adeia Guides Inc., San Jose, CA (US)

(72) Inventors: Jean-Yves Couleaud, Mission Viejo, CA (US); Charles Dasher, Lawrenceville, GA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 19/400,187

(22) Filed: Nov. 25, 2025

(65) Prior Publication Data

US 2026/0148671 A1 May 28, 2026

Related U.S. Application Data

(63) Continuation of application No. 18/990,191, filed on Dec. 20, 2024, now Pat. No. 12,505,777, which is a (Continued)

(51) Int. Cl.
*G09G 3/20* (2006.01)
*B60R 13/00* (2006.01)
(Continued)

(52) U.S. Cl.
CPC .......... *G09G 3/2003* (2013.01); *B60R 13/00* (2013.01); *G06F 3/017* (2013.01); (Continued)

(58) Field of Classification Search
None
See application file for complete search history.

(56) References Cited

U.S. PATENT DOCUMENTS 11,654,821 B1 * 5/2023 Durairaj .................. B60Q 1/26 701/1
12,403,819 B2 9/2025 Couleaud et al.
(Continued)

OTHER PUBLICATIONS

Toyota, "Towards a Future of One-of-a-Kind Cherished Vehicles Aligned with Personal Values" (Beyond Zero News Release Models Toyota Concept Vehicle Events Japan Mobility Show 2023 Battery BEV Motorsport Carbon Neutrality), (https://global.toyota/en/newsroom/corporate/39886279.html), (Oct. 16, 2023), (4 pages).

*Primary Examiner* — Stephen T. Reed
(74) *Attorney, Agent, or Firm* — HG LAW LLP

(57) ABSTRACT

System and methods are described for changing the exterior color of a vehicle with an exterior surface comprising a plurality of electronically programmable color cells. The systems and methods describe receiving a request to begin color programming mode on the vehicle and in response to determining that a state of the vehicle permits the color programming mode, activating a depth-sensing device configured to monitor for and detect a user action associated with the exterior surface. The systems and methods further describe receiving, at a user device communicatively coupled to the vehicle and to the depth-sensing device, a color selection; identifying, by the depth-sensing device, the location of an interaction point between the user action and the exterior surface determining, based on data captured by the depth-sensing device, an electronically programmable color cell that is located at the identified interaction point; and transmitting to the vehicle an instruction to change the color of the determined electronically programmable color cell to the selected color.

20 Claims, 14 Drawing Sheets

Related U.S. Application Data continuation of application No. 18/427,137, filed on Jan. 30, 2024, now Pat. No. 12,277,888.

(51) Int. Cl.

*G06F 3/01* (2006.01)
*G06F 3/04817* (2022.01)
*G06T 13/80* (2011.01)

(52) U.S. Cl.

CPC .......... *G06F 3/04817* (2013.01); *G06T 13/80* (2013.01); *G09G 2380/10* (2013.01)

(56) References Cited

U.S. PATENT DOCUMENTS

| | | | | |
|---|---|---|---|---|
| 2020/0005361 | A1* | 1/2020 | Zeiger | G06T 15/503 |
| 2024/0169595 | A1* | 5/2024 | Ramirez Solorzano | G06F 3/011 |
| 2025/0360869 | A1 | 11/2025 | Couleaud et al. | |

* cited by examiner

SYSTEM AND METHODS TO PROGRAM ACTIVE VEHICLE PAINT SURFACES

CROSS-REFERENCE TO RELATED APPLICATIONS

This application is a continuation of U.S. patent application Ser. No. 18/990,191, filed Dec. 20, 2024, which is a continuation of U.S. patent application Ser. No. 18/427,137, filed Jan. 30, 2024, now U.S. Pat. No. 12,277,888, the disclosures of which are incorporated by reference herein in its entireties.

BACKGROUND

The present disclosure is directed to systems and methods for changing the exterior color of a vehicle with a surface comprising a plurality of electronically programmable color cells. More particularly, the system and methods enable a user to customize the exterior color of a vehicle without requiring the user to refer back to a programming station to make changes.

SUMMARY

People often look to personalize their property to their own style and tastes, one example of such property being people's vehicles. The main method, by which owners personalize their vehicles is by changing the exterior look of their vehicles. Owners may apply a custom paint job, special decals or sticker wraps to create a personalized look; however, all these processes require specialty training and are often labor intensive. The emergence of color-programmable vehicles (e.g., through the use of E-ink) could replace the cumbersome process of physically painting or wrapping a vehicle with the operation of automatically reprogramming the exterior vehicle surface to a desired color. However, a method for configuring a color-programmable exterior vehicle surface that allows a user to quickly make specific changes to the surface is still needed.

In one approach of existing systems, a user may use an interface inside the vehicle (e.g., such as the screen of the vehicle infotainment system) to select different colors and patterns to apply on the vehicle. The vehicle interface would either display a list of options for colors and patterns or display a model of the vehicle that the user can interact with to customize its color. The second option would resemble a 3D modeling tool with all the programmable surface of the vehicle mapped into a 3D model of the vehicle. However, this approach, whether it displays a list or a 3D model, does not allow the user to see the changes they are making while they are selecting and applying their desired color and pattern selections. Furthermore, the owner's ability to configure the vehicle's color and pattern may also be limited by the interface not being able to detect the specific part of the vehicle that the user would like to interact with and customize.

In another approach, a user may use a separate mobile device to select and change the color of different parts of the vehicle. This approach could also display a list of options for colors on the mobile device or display a 3D modeling tool on the mobile device as described above. In this approach, users would be able to see changes on the exterior vehicle surface as they are made on the mobile device. Nonetheless, users would still be limited by the customization options provided to them by the interface of the mobile device. For example, current approaches to exterior vehicle surface customization only provide a limited set of selectable patterns and do not provide much granularity for the user to select and customize specific sections of the vehicle with particular colors. This approach also does not allow the user to interact directly with the vehicle, forcing the vehicle owner to refer back to the mobile device to apply any desired changes. Accordingly, there is a need to provide an intuitive method for owners to interact with their exterior vehicle surfaces in order to personalize electronically programmable color cells directly on the vehicle.

To help overcome these drawbacks, systems, methods, and apparatuses are disclosed herein for changing the exterior color of a vehicle with an exterior surface comprising a plurality of electronically programmable color cells. Implementing any of the one or more techniques described herein, a system or systems may be configured to receive a request to begin color programming mode on the vehicle. In response to determining that a state of the vehicle permits color programming mode, the system may be configured to activate one or more sensors configured to monitor for and detect a user action associated with the exterior surface. The system may be configured to then receive, at a user device communicatively coupled to the vehicle and to the depth-sensing device, a color selection and identify, by the depth-sensing device, the location of an interaction point between the user action and the exterior surface. The system can then determine an electronically programmable color cell that is located at the identified interaction point and transmit to the vehicle an instruction to change the color of the determined electronically programmable color cell to the selected color.

Such aspects enable providing a user a system for changing their exterior vehicle surface without the need to refer to a programming station while selecting and customizing specific electronically programmable color cells. As opposed to being limited by the interfaces described in the previous approaches, users can directly interact with (e.g., by touching or gesturing to) the electronically programmable color cells they would like to change. The resulting color change is visible immediately and does not require the user to go back to a programming station such as a dashboard or another user to operate the color change. By leveraging the depth-sensing device, the system also remains cost-effective by emulating the feeling of drawing or painting on the exterior vehicle surface for the user without the need for expensive touch sensors around the entire exterior surface of the vehicle. Implementing this system for changing the exterior color of a vehicle may lead to more creativity, diversity and personalization of vehicle paints.

In some embodiments, the depth-sensing device may be at least one of a sensor array installed on the vehicle or an external sensor array of an XR device. The user device may be at least one of a mobile computing device, an XR device, or a system integrated into the vehicle. In some approaches, the system does not include a user device. In such embodiments, users can make color selections directly on the exterior surface.

In some embodiments, the system disclosed herein may be configured to cause the plurality of electronically programmable color cells to display one of a pattern or animation in response to receiving the request to begin color programming mode to indicate that the plurality of electronically programmable color cells are ready to be programmed with a new color. Such aspects enable a user to quickly identify which electronically programmable color cells they need to interact with in order to program their custom surface pattern.

In some implementations, in response to receiving the request to change the color of the electronically programmable color cell to the selected color, the system may be configured to cause the electronically programmable color cell to stop displaying the one of the pattern or the animation, subsequently changing the color of the electronically programmable color cell to the selected color and storing the selected color in association with the electronically programmable color cell at the vehicle. Such aspects enable a user to customize the exterior vehicle surface while still being aware of what electronically programmable color cells still need to be changed. Indicating to the user where to change the color of the vehicle directly from the exterior vehicle surface removes the need for the user to constantly refer back to the dashboard of the color customization application.

In some approaches, determining that the state of the vehicle permits a color programming mode comprises determining at least one of whether the vehicle's motor is on, whether the vehicle ignition is on, whether the vehicle is unlocked, whether the vehicle is within a location that permits color programming mode, or whether the vehicle is within proximity of a key associated with the vehicle. Such aspects, enable the system to ensure that the user customizes the exterior vehicle surface in a safe environment.

In some embodiments, the system is configured to receive the color selection from a vehicle color customization application. The system may receive the color selection on the vehicle color customization application by causing display of a color selection interface comprising selectable icons for a plurality of colors on the user device. The system may receive a selection of one of the colors of the plurality of colors and store the color selection at the user device. In some approaches, the vehicle color customization application is installed on the user device such that the color selection interface is generated for display on the interface of the user device. In some embodiments, the vehicle customization is installed on the vehicle, such that the color selection interface is generated for display on the interface of the exterior surface.

In some implementations, the vehicle can be set to temporary painting mode, the temporary painting mode comprising enabling the vehicle to connect to a plurality of other devices, each running a vehicle color customization application and changing the colors of a plurality of programmable cells. When the vehicle enters driving mode, the newly programmed colors on the exterior vehicle surface are changed back to the color of the programmable cell prior to the temporary painting mode.

Such aspects enable multiple users to make changes to the vehicle simultaneously based on the color they select on the vehicle customization application running on their device. In some embodiments, the system may be configured to associate each user interacting with exterior vehicle surface with the device they are using to run the vehicle customization application. This would allow each user to uniquely choose a color and change certain cells to that color. In some embodiments, multiple users can simultaneously make changes to the active vehicle surface based on a single-color selection from the vehicle customization application running on one device. Such aspects could enable the electronically programmable surface of the vehicle to be turned into a tool for collaboration and leisure when the user of the vehicle is with a group of people.

In some embodiments, the system disclosed herein may be configured to transmit to the vehicle a plurality of requests to change colors of a plurality of respective determined electronically programmable color cells to respective selected colors, wherein the selected colors of the electronically programmable color cells make up a color pattern. In response to determining that the vehicle has entered driving mode, the system may be configured to continue displaying the color pattern and store the color pattern at the vehicle or an external storage device along with other previously configured color patterns. Some approaches enable the user to select one of the previously configured color patterns stored at the vehicle to be immediately displayed on the exterior vehicle surface.

Such aspects of storing color patterns and selecting previously configured color patterns enable users to keep a catalog of color patterns that they can efficiently switch between based on what the user would like their vehicle to look like. In some embodiments, users can share their stored color patterns with other users so that those users can also display the shared color pattern on their vehicles. In some approaches, each color pattern is specific to the vehicle's make and model, whereas in other approaches, the color pattern may be adjusted so that it can be applied to any make and model.

In some embodiments, the user action corresponds to a user touching the exterior surface such that the interaction point is the contact point between the user and the exterior surface. In such embodiments, the user may drag their hand across several programmable cells to simulate painting the exterior surface therefore making the hand drag comparable to a paint stroke. In some approaches, the amount of color cells changed by the user may change based on how many hands and/or fingers interact with the vehicle surface. For example, the paint stroke width of a one-hand drag may be narrower than the paint stroke of a two-hand drag.

In some embodiments, the user action corresponds to a user gesturing to the exterior surface such as pointing or waving. In such embodiments, the interaction point is determined based on where on the exterior surface the user is pointing and or gesturing to. Such aspects enable a user to customize parts of the exterior surface that may be hard to reach (e.g., the roof).

In some embodiments, the active vehicle surface system can be implemented on other smaller or larger objects with active color surfaces. Such larger objects may include a house. The system could also be implemented onto smaller objects such as a piece of clothing or a piece of furniture.

DETAILED DESCRIPTION

Figures 1A, 1B:
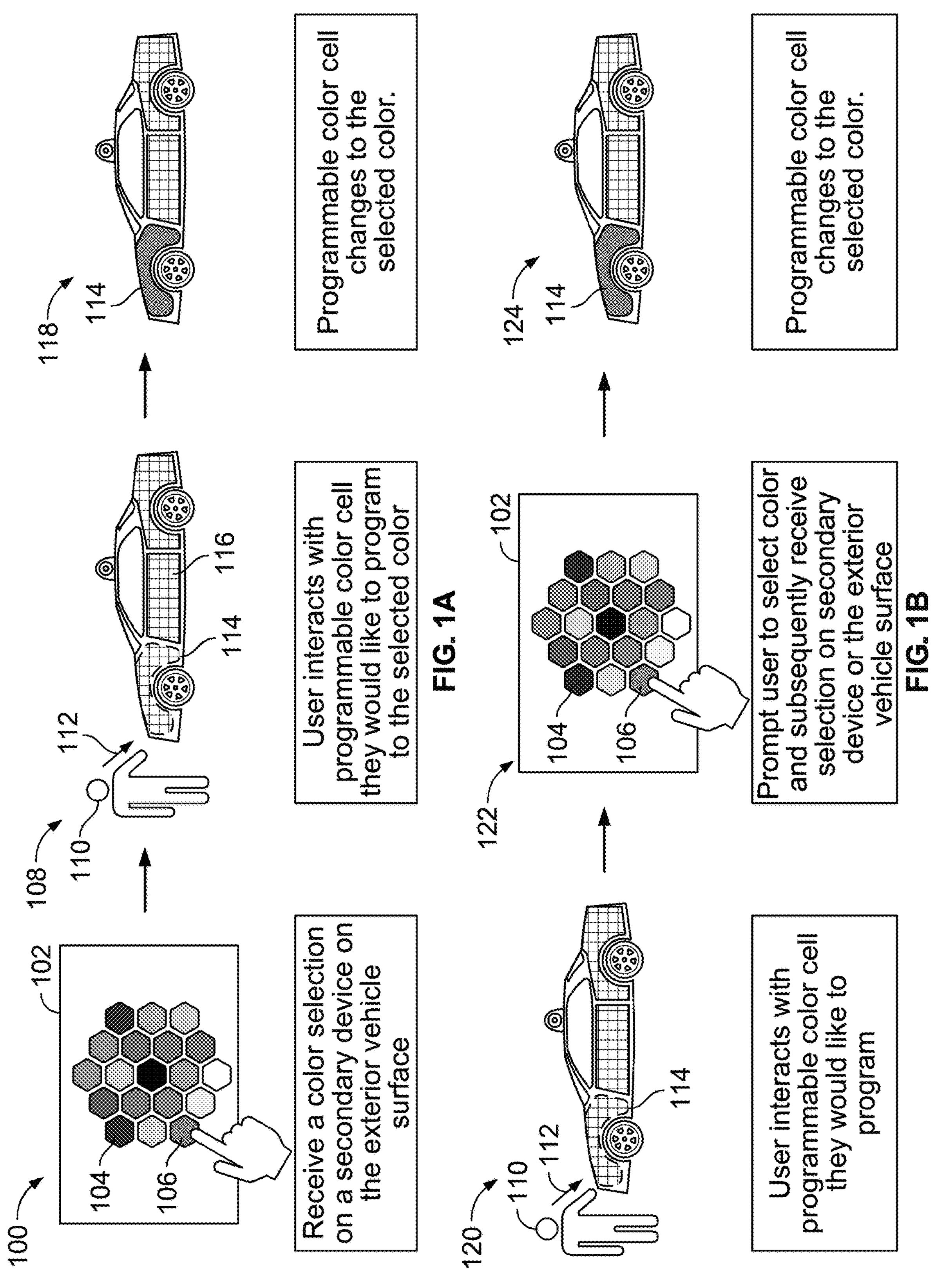
FIGS. 1A-1B are schematic illustrations of modifying the electronically programmable color cell of an exterior vehicle based on a user selection of a color and a detected user action, in accordance with embodiments of the disclosure.
Figure 9:
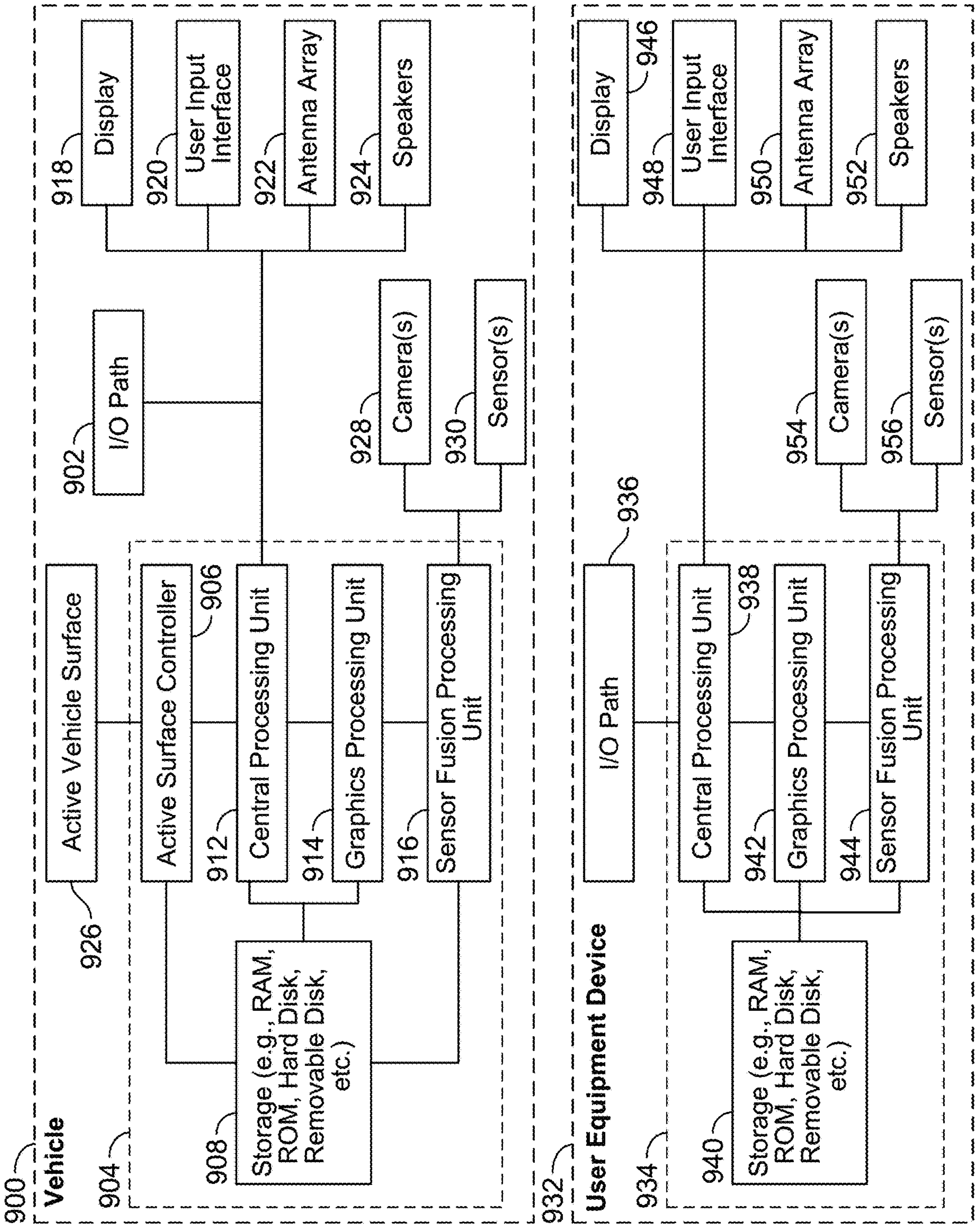
FIG. 9 is a block diagram of an illustrative example of a vehicle architecture and a user equipment device, in accordance with embodiments of the disclosure.

FIGS. 1A-1B are a schematic illustration of modifying the electronically programmable color cell of an exterior active vehicle surface (e.g., active vehicle surface 926 as shown in FIG. 9) based on a user selection of a color and a detected user action, in accordance with embodiments of the disclosure. As referred to herein the terms "color cell" or "cell" refer to one of the electronically programmable color cells installed on the exterior vehicle surface. As shown in color selection phase 100 of FIG. 1A, the system for modifying the color cells may include color programming application 102. In some embodiments, the color programming application may run on a mobile device, a computer, an XR device, the vehicle key, the vehicle infotainment system, the active surface or any other suitable device. Color programming application 102 enables a user to make a color selection for a desired color, before they interact with the active vehicle surface. The color programming application may display color selection interface 104 (e.g., displayed on display 918 and/or display 946 of FIG. 9). Color selection interface 104 may comprise a grid of colors, a list of colors, a color wheel, an input field for RGB values, any other suitable color selection interface, or any combination thereof. As shown in FIG. 1A, color programming application 102 receives an input corresponding to a selection for color 106.

As shown in cell selection phase 108 of FIG. 1A, the active vehicle surface system for modifying the color cell may also comprise a monitoring system (e.g., a system comprising sensor(s) and/or camera(s) such as those described below in connection with FIG. 9) that detects which cell of the exterior vehicle surface a user would like to change to color 106. User 110 may be standing near the vehicle and perform user action 112 corresponding to color cell 114. In some embodiments user action 112 may comprise the user touching color cell 114, gesturing to color cell 114, looking at color cell 114, any other suitable embodiment, or any combination thereof. Based on the user action, the active vehicle surface system may determine that the user would like to modify the color of color cell 114 to color 106. An example means for determining which cell user action 112 corresponds to will be further described in FIGS. 2-4.

In some embodiments, the transition from color selection phase 100 to cell selection phase 108 may include an active surface controller (e.g., active surface controller 906 of FIG. 9) transmitting a command to the active vehicle surface to go into a color programming mode. A user may transmit the command for the active vehicle surface from a device (e.g., a mobile device, the vehicle infotainment display, etc.) which may be running the color programming application. Before receiving the command to enter the color programming mode, the system may not be enabled to detect user actions and program color cells, thus ensuring that general actions during normal use of the vehicle are not interpreted as requests to program a color cell. The vehicle's active surface controller, which is embedded in the vehicle, may be programmed to assign a specific color to any of the color cells. When in color programming mode, the active vehicle surface may display a programming pattern to indicate to the user the location of said color cells (e.g., a grid pattern as shown on color cell 116). In some approaches, the programming pattern may be a color pattern, animated pattern, a blank color, any other suitable pattern displayed by the active vehicle surface, or any combination thereof. When a user programs a certain color cell, the vehicle's active surface controller instructs the respective color cell to stop displaying the color and/or animation associated with the programming pattern. The vehicle's active surface controller continues to instruct the unprogrammed color cells to display the color and/or animation of the programming pattern to allow the user to easily see which cells they have not interacted with yet. For example, if the programming pattern is a blinking pattern, then all the cells that have been programmed already will exhibit a solid color while the cells that still need to be programmed remain blinking.

In some embodiments, the active vehicle surface system may determine that user action 112 corresponds to multiple cells. For example, the user may touch the surfaces of both color cell 114 and color cell 116. The active vehicle surface system subsequently determines that the user would like to change the color of both cells simultaneously. In some embodiments, the user can continue performing user actions to select cells for programming until a specific programming command is issued (e.g., the user makes a specific gesture that corresponds to the active vehicle surface transmitting an instruction for the cells to program the new color).

As shown in the color programming phase 118 of FIG. 1A, the system for modifying the color cell may program the color of a cell based on a user selection of a desired color and a subsequent user action. After detecting user action 112 and determining that user action 112 corresponds to color cell 114, the system programs color cell 114 to color 106. In some embodiments, user action 112 corresponds to multiple color cells resulting in color 106 being programmed on the multiple color cells simultaneously. In some embodiments, the user may perform a second user action without selecting a second color from color selection interface 104. When this occurs, the system programs the color cell corresponding to the new user action to the last color selection (e.g., color selection for color 106).

As shown in cell selection phase 120 of FIG. 1B, a user may select a cell for color programming before they have selected a color. In some embodiments, user 110 may transmit the command to begin color programming mode without selecting a color, and may subsequently perform user action 112 corresponding to color cell 114. Upon receiving the command to begin color programming mode and subsequently detecting user action 112 corresponding to color cell 114, the vehicle's active surface controller may communicate with color programming application 102, prompting user 110 to select a color from color selection interface 104.

In some embodiments, in response to determining that user action 112 corresponds to color cell 114, the system may modify color cell 114 to be visually distinguishable from other color cells as represented by the dashed line around color cell 114. The dashed line is provided to clarify which color cell is being selected and does not represent a mandatory feature of the system. For example, in some embodiments the size of the color cells that make up the active surface are too large thus not allowing for a high enough cell resolution to generate borders like the dashed line around color cell 114. Color cell 114 may be modified to be visually distinguishable by programming it to display a bright color, an animation (e.g., blinking), any other suitable programming identifier, or any combination thereof. If the cell resolution of the active surface is high enough, the color cells may also display a border or animation around the selected color cell. Making color cell 114 visually distinguishable indicates to user 110 which cell they have selected and that it is ready to be programmed with a color.

As shown in color selection phase 122 of FIG. 1B, the color programming application may be prompted to show color options in response to the active vehicle surface detecting a user action corresponding to a color cell. After user 110 has performed user action 112 to select color cell 114, they can subsequently select color 106 from color selection interface 104. The user's color selection for color 106 is then subsequently transmitted back to the vehicle's active surface controller. As shown in color programming phase 124, the vehicle's active surface controller subsequently programs color cell 114 to color 106. When the vehicle's active surface controller programs color cell 114 with color 106, it also removes the programming indicator.

Figure 2:
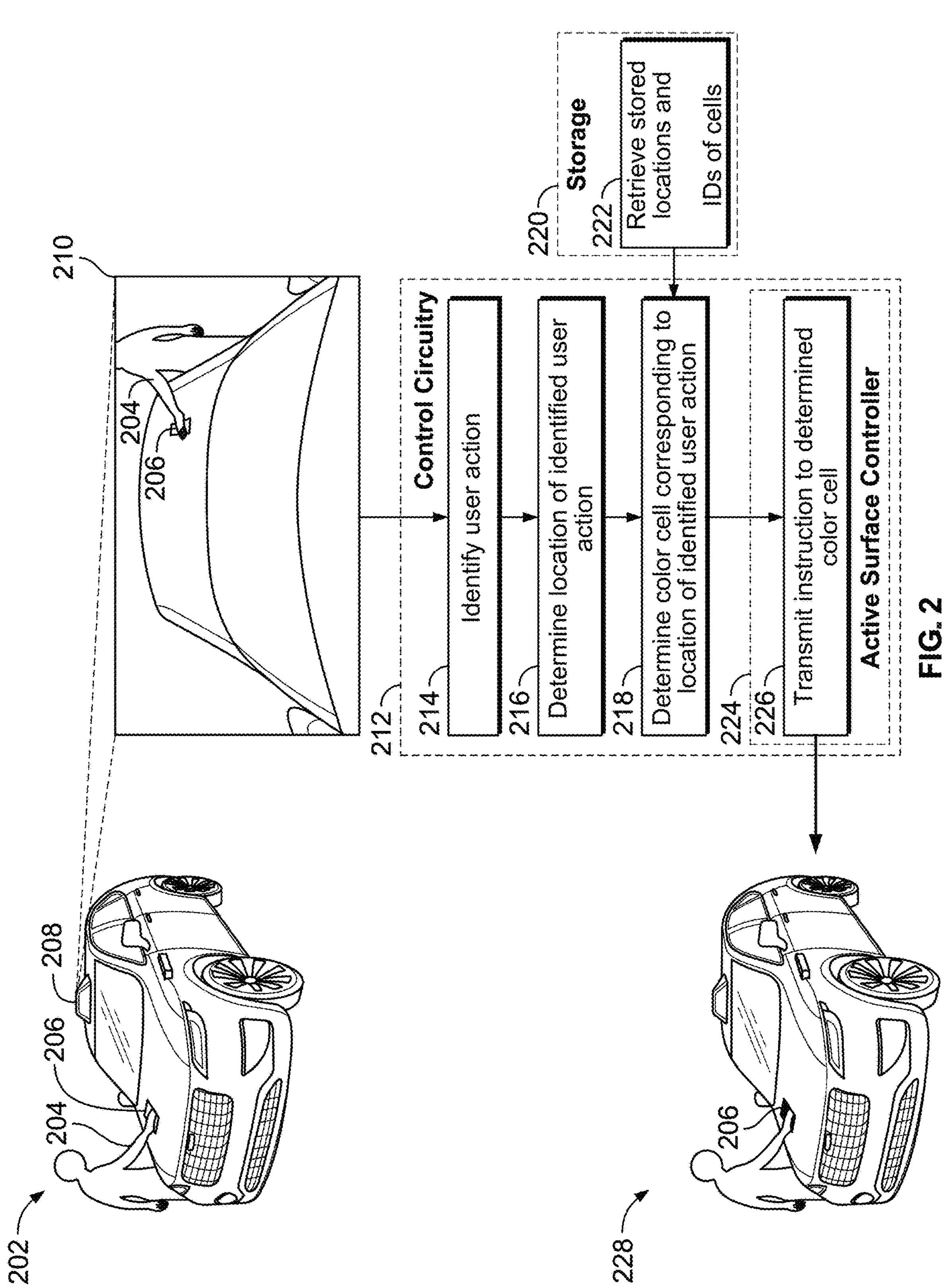
FIG. 2 is a schematic illustration for utilizing external sensors to determine the electronically programmable color cell corresponding to a detected user action, in accordance with embodiments of the disclosure.

FIG. 2 is a schematic illustration for utilizing external sensors to determine the color cell that corresponds to a detected user action, in accordance with embodiments of the disclosure. Image 202 depicts user action 204 being performed on the vehicle surface. User action 204 may be a person pointing to and/or touching to a color cell 206 of the exterior vehicle surface. In order to detect user actions around the vehicle and subsequently identify electronically programmable color cells associated with the user actions, the active vehicle surface system may be equipped with monitoring system 208 (e.g., a system comprising sensor(s) and/or camera(s) such as those described below in connection with FIG. 9). In some embodiments, the monitoring system may be a set of optical sensors (e.g., cameras, LIDAR, etc.), proximity sensors, IR sensors, motion sensors, ultrasonic sensors, touch sensors, any other suitable sensor, or any combination thereof. In some approaches, the monitoring system may be a part of the advanced driver assistance system (ADAS) or the autonomous vehicle (AV) system. In such an approach the monitoring system may change between different operating states based on the driving state of the vehicle. For example, if the vehicle motor is on, the monitoring system is set to monitor for collision and object detection. When the user turns off the vehicle motor and launches the color programming application the monitoring system may switch to color programming mode and begin monitoring for user actions around the vehicle. In some embodiments, the monitoring system may be the sensor array of a user device such as a mobile device, XR device, or any other suitable sensor equipped device.

Image 210 depicts data captured by monitoring system 208 to track user actions around the vehicle surface (e.g., active vehicle surface 926 of FIG. 9). Monitoring system 208 may collect data to generate a spatial mapping of the vehicle and its surroundings as shown in image 210. In some embodiments, monitoring system 208 can collect the data for spatial mapping directly using depth sensors such as LIDAR, ultrasonic sensors, or depth-sensing cameras, which are equipped to precisely measure depth. The depth data can be sent to control circuitry 212 (e.g., sensor fusion processing unit 916 of control circuitry 904 and/or sensor fusion processing unit 944 of control circuitry 934 as shown in FIG. 9) to then derive the position of the vehicle surface and various user actions around it. In some approaches, monitoring system 208 may be equipped with sensors (e.g., standard cameras, light sensors, motion sensors, etc.) that cannot discretely define depth and position based on the sensor data alone. However, control circuitry 212 may utilize image analysis to derive depth and positions of objects around the vehicle to then create an approximate spatial mapping which may also resemble the spatial map shown in image 210. The depth and location of the vehicle surface and the objects around it are represented by a geometric mesh as shown in image 210.

In step 214, using the spatial map and any other suitable imaging technology, control circuitry 212 (e.g., graphics processing units 914, 942 and/or sensor fusion processing units 916, 944 of control circuitries 904, 934 respectively as shown in FIG. 9) may utilize gesture detection algorithms to identify user actions around the vehicle. In some embodiments, the gesture detection algorithms may be configured to detect the number of hands, each hand having a certain number of fingers extended, a certain direction of motion, a certain position, a threshold distance to the vehicle surface, any other suitable property, or any combination thereof and associate them with a user action. For example, based on the spatial map of image 210, control circuitry 212 may determine that a detected object comprises one hand with one finger extended, that finger pointing in the direction of the vehicle surface, and the hand being positioned within a threshold distance of the vehicle surface, thus identifying it as user action 204.

In step 216, control circuitry 212 may determine the location corresponding to the user action based on a detected interaction point. Once control circuitry 212 determines that the object detected by monitoring system 208 corresponds to user action 204, control circuitry 212 can use the depth data from the spatial map to derive the location of user action's 204 interaction point with the vehicle surface. In some embodiments, the interaction point corresponds to a user touching the vehicle surface. In this case, control circuitry 212 derives the location of the point of contact between the user and the active vehicle surface. In some embodiments, the interaction point corresponds to a pointing or gesturing to the vehicle surface. In this case, control circuitry 212 derives the location on the active vehicle surface that the pointing or gesturing is directed towards. By configuring the monitoring system to also detect user gestures beyond just touch interactions, it enables the user to also program hard-to-reach surfaces such as the roof of the vehicle.

In step 218, control circuitry 212 (e.g., central processing unit 912 of control circuitry 904 and/or central processing unit 938 of control circuitry 934 as shown in FIG. 9) determines the color cell that the user would like to program based on user action 204. In some embodiments, control circuitry 212 takes step 222 to retrieve the known locations of each color cell from storage 220 (e.g., storage 908 and or storage 940 of FIG. 9) and matches the known location of a color cell to the determined location of user action 204's interaction point. For example, control circuitry 212 concludes that the determined location associated with user action 204 corresponds to the location of color cell 206. Control circuitry 212 therefore determines that the user would like to program the color of color cell 206. After determining that color cell 206 is to be programmed, active vehicle surface controller 224 receives the cell ID of color cell 206 and a command to transmit instructions to color cell 206 associated with the cell ID.

In some approaches, the system stores the location of each electronically programmable color cell relative to the reference point on the vehicle in storage 220. In some embodiments, the reference point is the origin point for the location data of the monitoring system. In some embodiments, the reference point is a known location on the vehicle surface. Methods and systems for determining the color cell location will be further described in the discussion of FIGS. 4A-4B.

In step 226, active vehicle surface controller 224 (e.g., active vehicle surface controller 906 of control circuitry 904 as shown in FIG. 9) transmits an instruction to color cell 206 associated with the received cell ID. In some embodiments, the user has already selected a color for programming (e.g., as described in the scenario depicted in FIG. 1A) before performing the user action. In this case active surface controller 224 transmits an instruction to color cell 206 to display the selected color (e.g., as shown in image 228 of FIG. 2). In some embodiments, the user has not selected a color for programming (e.g., as described in the scenario depicted in FIG. 1B) before performing the user action. In this case, the color programming application may send an indication to the user that they must select a color from the color selection interface (e.g., color selection interface 104 of FIG. 1A).

Figure 3:
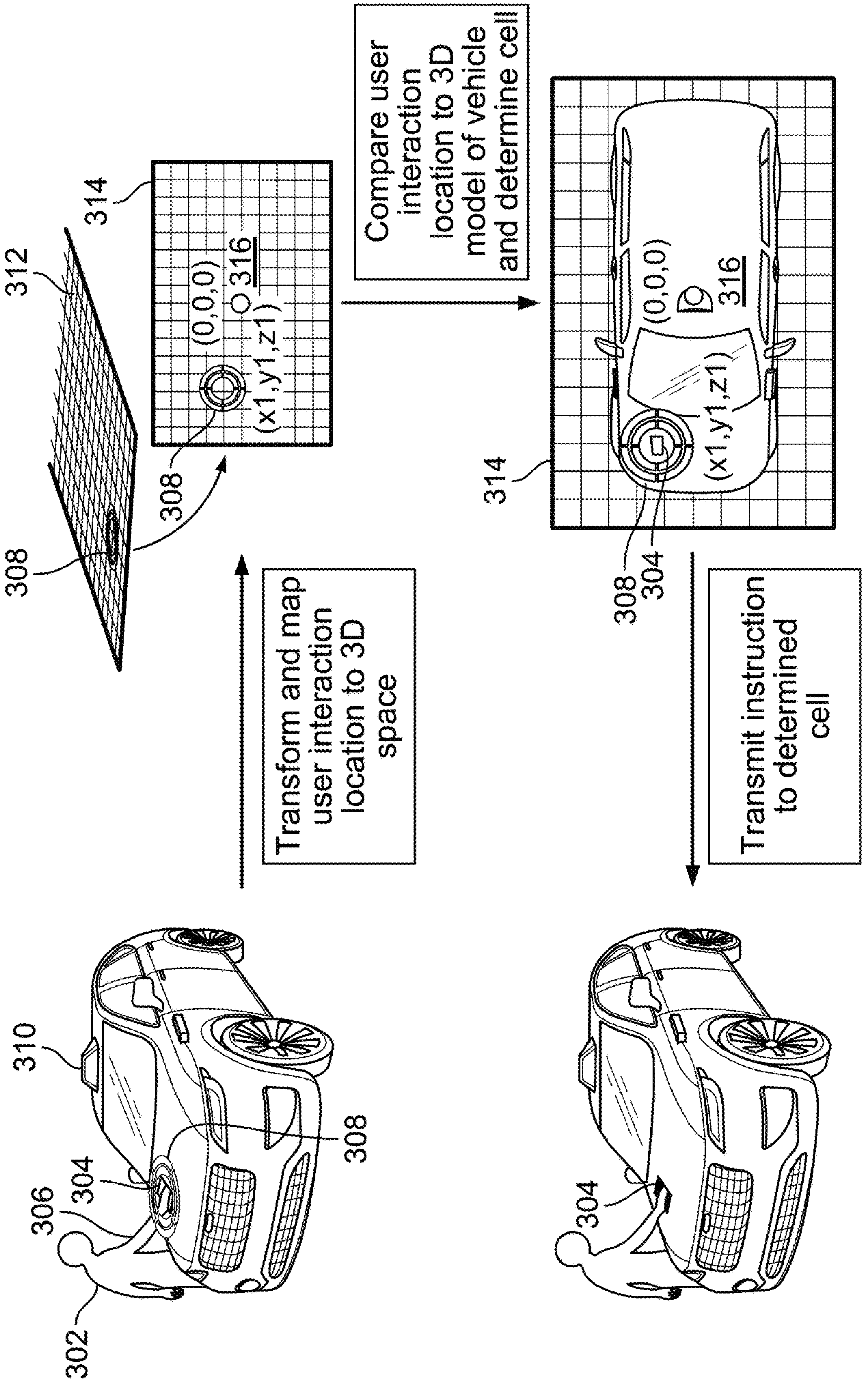
FIG. 3 is a schematic illustration for utilizing external sensors and coordinate mapping to determine the electronically programmable color cell corresponding to a detected user action, in accordance with embodiments of the disclosure.

FIG. 3 is a schematic illustration for utilizing external sensors and coordinate mapping to determine the electronically programmable color cell corresponding to a detected user action, in accordance with embodiments of the disclosure. As shown in FIG. 3, user 302 may perform user action 306 to interact with color cell 304. The user interacts with the vehicle at interaction point 308, which is detected by monitoring system 310 (e.g., a system comprising sensor(s) and/or camera(s) such as those described below in connection with FIG. 9). In some embodiments, monitoring system 310 uses gesture detection as described in the discussion of FIG. 2 to detect user actions around the vehicle. In some embodiments, monitoring system 310 is equipped with sensors such as LIDAR, ultrasonic sensors, or depth-sensing cameras, which are equipped to precisely measure depth. In this case, the control circuitry can combine sensor data to calculate an exact location of interaction point 308. In some approaches, monitoring system 310 may be equipped with sensors (e.g., standard cameras, light sensors, etc.) that cannot discretely define depth and position based on the sensor data alone. In this case, the control circuitry (e.g., graphics processing units 914, 942 and/or sensor fusion processing units 916, 944 of FIG. 9) may use image-based mapping, environmental cues in the sensor data, other image-based algorithms or any combination thereof, to calculate an approximate location of interaction point 308.

Once the location of interaction point 308 is calculated, the control circuitry (e.g., the central processing units 912, 938; graphics processing units 914, 942; and/or sensor fusion processing units 916, 944; of control circuitries 904, 934 respectively, as shown in FIG. 9) transforms the location information 312 from the sensor data into 3D space 314 with a proportional coordinate system containing origin point 316. Origin point 316 may correspond to the origin point utilized by the sensors of the monitoring system or a known reference point on the vehicle. The control circuitry now defines the location of interaction point 308 as $(x_1,y_1,z_1)$ relative to origin point 316 within the 3D space. The location coordinates may be set in a coordinate system equivalent to the scale of the real-world environment of the vehicle or may be set in a coordinate system that has been scaled up or down. The control circuitry may also generate a model of the vehicle into 3D space 314 with the same origin point 316 and, in some embodiments, may be scaled down or up to match the scaling of the 3D space's coordinate system. Since both the vehicle model and interaction point 308 are mapped into the same coordinate system with origin point 316, the control circuitry (e.g., central processing unit 912 of control circuitry 904 and/or central processing unit 938 of control circuitry 934 as shown in FIG. 9) may determine that the interaction point 308 occurred at the coordinates $(x_1,y_1,z_1)$ of the vehicle model surface. In some embodiments, the vehicle 3D model may include a data structure assigning each color cell to a set of coordinates in the 3D space. The set may encompass data points assigned to particular areas of the vehicle model surface (e.g., a volume of coordinate data points). By referencing the data structure of assigned color cell coordinates, the control circuitry may determine that coordinates $(x_1,y_1,z_1)$ of the vehicle model correspond to color cell 304.

Once the control circuitry determines color cell 304 corresponding to interaction point 308, the vehicle's active surface controller (e.g., active surface controller 906 FIG. 9) transmits an instruction to color cell 304. As described in FIG. 2 the instruction will vary based on whether the user has selected a color for programming prior to performing user action 306. If the user has already selected a color, the vehicle's active surface controller transmits an instruction to color cell 304 to display the selected color. If the user has not selected a color prior to performing user action 306, the vehicle's active surface controller transmits an instruction for the color cell to enter programming mode.

Figure 4A:
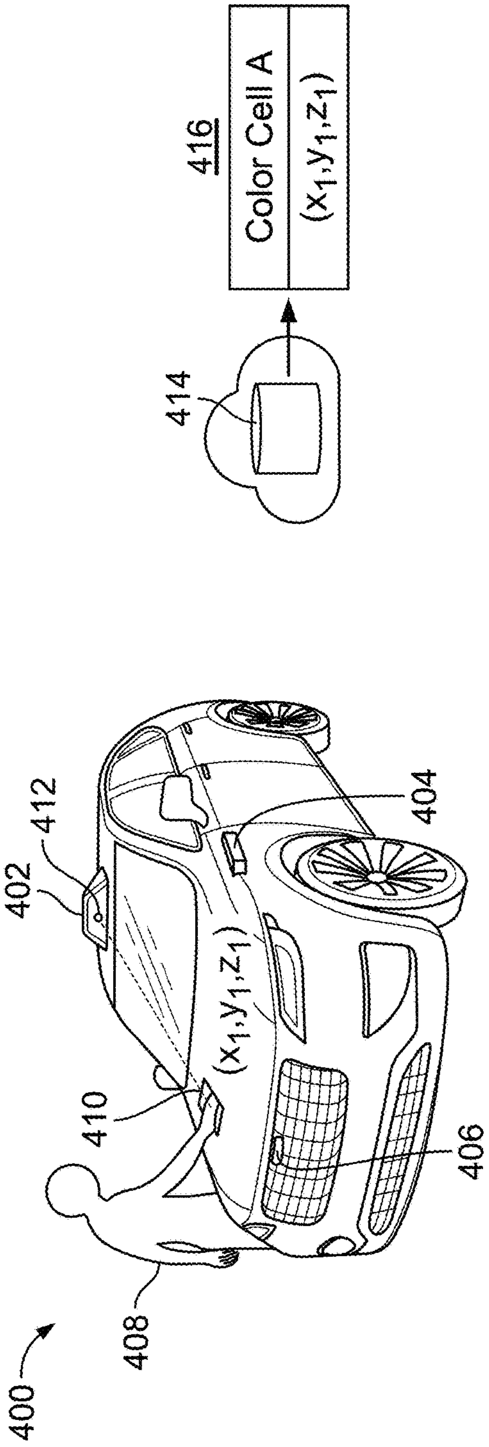
FIGS. 4A-4B are schematic illustrations demonstrating how different monitoring systems determine location data of color cells interacted with by the user, in accordance with embodiments of the disclosure.

FIG. 4A is a schematic illustration demonstrating how a fixed monitoring system installed on the vehicle determines location data of color cells interacted with by the user, in accordance with embodiments of the disclosure. In some embodiments, the monitoring system (e.g., a system comprising a sensor(s) and/or camera(s) such as those described below in connection with FIG. 9) may be a part of the ADAS or the AV system installed in and/or on the vehicle. The monitoring system may comprise measurement equipment such as cameras, proximity sensors, IR sensors, motion sensors, ultrasonic sensors, LIDAR, any other suitable equipment, or any other combination thereof used to measure and map the space around the vehicle. As referred to herein, "sensor" refers to any suitable measurement equipment utilized by the monitoring system. As shown in scene 400, sensors 402, 404, 406, that make up a monitoring system, may detect and measure user 408 performing a user action at interaction point 410. Since each sensor captures location data corresponding to interaction point 410 from different distances and angles, the control circuitry (e.g., sensor fusion processing unit 916 of control circuitry 904 and/or sensor fusion processing unit 944 of control circuitry 934 as shown in FIG. 9) must transform all the location data into a shared coordinate system with a common origin. This enables the active vehicle surface system to have a comprehensive picture of the vehicle's surroundings under consistent one perspective.

As shown in scene 400, the control circuitry may set the origin for the location data to origin point 412 (e.g., a reference point as described in FIG. 2). After transforming the location data to origin point 412, the control circuitry can calculate the coordinates for the location of interaction point 410 with respect to origin point 412. For example, the control circuitry may determine that the coordinates of interaction point 410 are $(x_1,y_1,z_1)$. The control circuitry can now use the determined coordinates of interaction point 410 to determine which color cell interaction point 410 corresponds to. In some embodiments, the control circuitry (e.g., central processing unit 912 of control circuitry 904 and/or central processing unit 938 of control circuitry 934 as shown in FIG. 9 may compare the coordinates of the interaction point to coordinates associated with each color cell stored in storage 414 (e.g., storages 908, 940 of FIG. 9 and/or database 1014 of FIG. 10) to determine the corresponding color cell. The control circuitry may determine that interaction point 410 corresponds to Color Cell A 416 based on determining that the stored coordinates of Color Cell A 416 are closest to the coordinates of interaction point 410. For example, control circuitry may determine that Color Cell A 416 coordinates are within a threshold distance of interaction point 410's coordinates or may even determine that they have matching coordinates $(x_1,y_1,z_1)$. Based on the comparing and determining between the interaction point and color cell, the vehicle's active surface controller (e.g., active surface controller 906 of FIG. 9) can now send an instruction to Color Cell A 416.

Figure 4B:
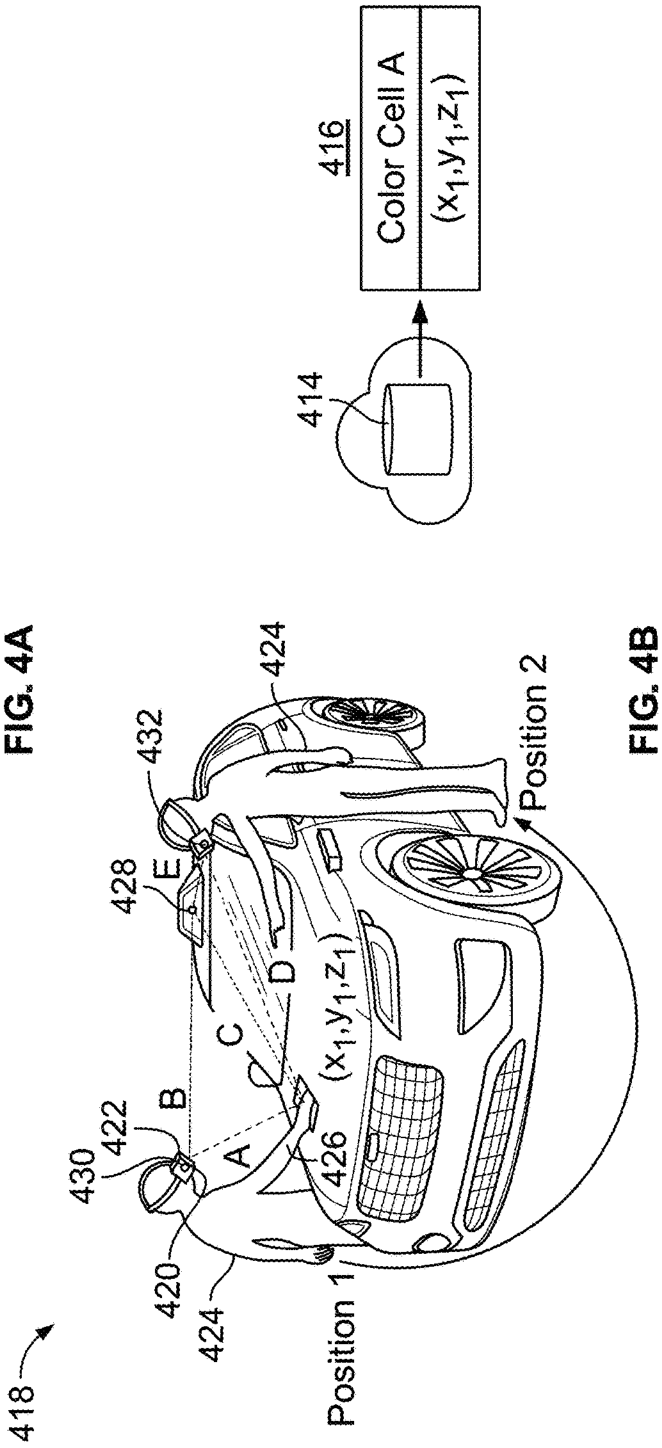

FIG. 4B is a schematic illustration demonstrating how a mobile monitoring system determines location data of color cells interacted with by the user, in accordance with embodiments of the disclosure. In some embodiments, the monitoring system (e.g., a system comprising a sensor(s) and/or camera(s) such as those described below in connection with FIG. 9) may be the sensor array of a user device such as a mobile device, XR device, or any other suitable sensor-equipped device. The monitoring system may comprise sensors such as cameras, proximity sensors, IR sensors, motion sensors, ultrasonic sensors, LIDAR, any other suitable embodiments, or any other combination thereof used to measure and map the vehicle's surroundings based on the collected data (e.g., depth data). Scene 418 depicts a user interacting with the vehicle's active surface from position 1 and then subsequently from position 2. As shown in position 1, sensors 420, 422 may detect and measure user 424 performing a user action at interaction point 426. Since sensors 420, 422 captures location data corresponding to interaction point 426 from a different distance and angle, the control circuitry must transform all the location data into a shared coordinate system with a common origin. This enables the active vehicle surface system to have a comprehensive picture of the vehicle's surroundings under one perspective.

As shown in scene 418, the control circuitry may set the origin for the location data to origin point 430. However, whereas origin point 412 of the monitoring system of FIG. 4A stays stationary with respect to the vehicle surface, origin point 430 may change as a user moves the monitoring system around the vehicle. In some embodiments, the location of each color cell is stored in storage 414 with respect to a static reference point on the vehicle instead of origin point 430 for storage efficiency. For example, the locations of the color cells may be stored in storage 414 with respect to reference point 428. In order to use the location data captured by the mobile monitoring system to compare to the locations stored in storage 414, the active vehicle surface system may utilize Simultaneous Localization and Mapping (SLAM) algorithms. SLAM may allow control circuitry to consistently map and track the vehicle surface, regardless of the monitoring system position. In some embodiments, control circuitry may create a hybrid mapping by utilizing a stored mapping of the vehicle integrated with the real-time mapping calculated through SLAM. Opposed to creating an approximate mapping solely using real-time data, the hybrid mapping enables the control circuitry to precisely localize the monitoring system with respect to the vehicle and accurately map locations on the vehicle such as the location of reference point 428. Based on the hybrid mapping of the vehicle and its environment, control circuitry may then triangulate the specific location of the user interaction. For example, based on distances A and B from origin point 430, the control circuitry can triangulate the distance C between reference point 428 and interaction point 426 in the hybrid mapping to conclude that the coordinate of the interaction point is $(x_1,y_1,z_1)$ with respect to reference point 428. If user 424 moves the monitoring system to origin point 432 at position 2, the triangulation method can still solve for the same distance C to calculate for the coordinate $(x_1,y_1,z_1)$ (e.g., by using known distances E and D) in the hybrid mapping even though the monitoring system's origin point is non-constant. In some embodiments, the monitoring system may utilize multiple reference points on the vehicle to determine the location of a vehicle cell. In some approaches, the reference point is a notable physical feature on the vehicle, a distinctive marker displayed by other color cells (e.g., a QR code or special symbol), any other suitable reference point, or any combination thereof. Saving the location of the color cells with respect to set reference points enables the active vehicle surface system to minimize the number of location data it needs to store for each color cell, as opposed to storing location data with respect to all possible different origin points around the vehicle.

After triangulating the coordinate of interaction point 426 with respect to reference point 428, the control circuitry may compare them to the coordinates associated with each color cell to determine which color cell interaction point 426 corresponds to. For example, the active vehicle surface system may determine that interaction point 426 corresponds to Color Cell A 416 since they each have matching coordinates $(x_1,y_1,z_1)$. Based on the comparing and matching between the interaction point and color cell, the active vehicle surface system can now enable the vehicle's active surface controller to send an instruction to Color Cell A 416.

In some embodiments, the active vehicle surface may be equipped with touch-sensing technology such as capacitive or resistive touch films. In such embodiments, the active vehicle system can precisely determine where a user interacts with the vehicle surface without the need to calculate the interaction point using the external sensors of the vehicle's monitoring system or user device. In some approaches, the car may be fitted with vibrating elements positioned in contact with the vehicle's external surface at multiple points such as surface junctions (e.g., where two body panels such as the hood and the header panel or the fender meet for example). In addition, the vehicle may be similarly fitted with vibration sensors (i.e., accelerometers) at other key points of the vehicle's surface. The vehicle's active surface controller may send a signal to each of the vibrating elements, causing them to generate vibration waves that can be measured by the vibration sensors. An individual touching the car surface may cause the vibration pattern to change in a way that correlates with where the car is touched. In some embodiments, a machine learning model may be trained (or re-trained for a particular user during a training/calibrating session) to derive car cell identification from wave pattern measurements.

Figure 5:
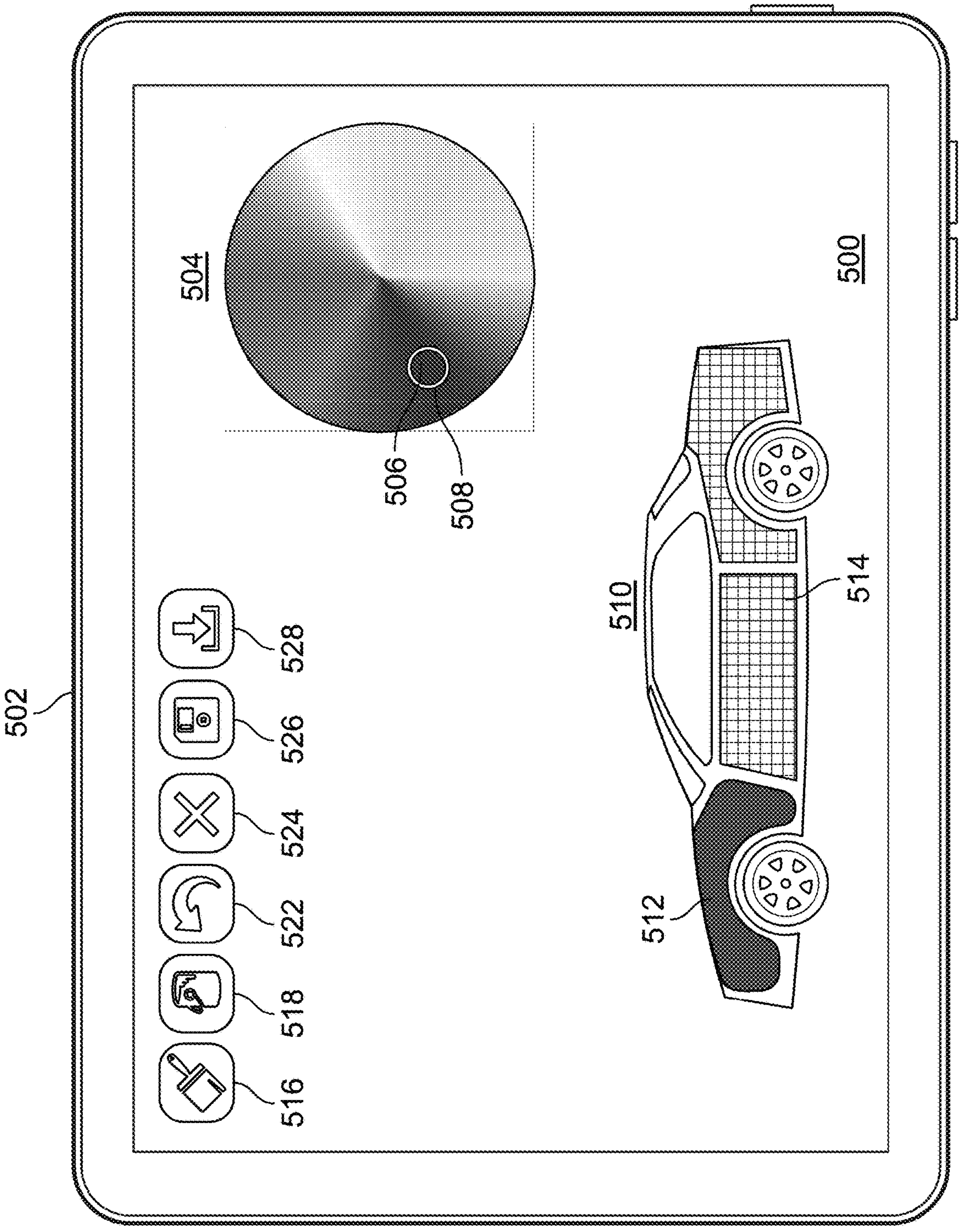
FIG. 5 shows illustrative user interfaces for receiving a color selection to program the active vehicle surface, in accordance with embodiments of the disclosure.

FIG. 5 shows illustrative user interfaces for receiving a color selection to program the active vehicle surface, in accordance with embodiments of the disclosure. User interface 500 (e.g., corresponding to user input interface 920 and/or user input interface 948 of FIG. 9) as shown in FIG. 5 represents one embodiment for the user interface of the color programming application. The user interface may be displayed on user device 502 (e.g., using display 918 and/or display 946 of FIG. 9). In some approaches, the user device is a mobile device (e.g., a phone or tablet) a computer, an XR device (e.g., a VR headset) the vehicle key, the vehicle infotainment system, the vehicle active surface or any other suitable device. When a user opens user interface 500 of the color programming application, they may utilize color selection interface 504 to select the color they would like to program a certain part of the active vehicle surface to. Color selection interface 504 may comprise a grid of colors, a list of colors, a color wheel, an input field for RGB values, any other suitable color selection interface, or any combination thereof. In the example shown in FIG. 5, a user has selected color 506. The color programming application may indicate which color has been selected by displaying a selection indicator around it (e.g., ring 508). In some embodiments, the selection indicator may be a highlight, a shadow, a border, an animation, any other suitable selection indicator, or any combination thereof.

User interface 500 of the color programming application may also include vehicle model 510, which displays a model of the connected vehicle with an accurate representation of which color cells have been programmed with a color. For example, vehicle model 510 shows that color cell 512 has been programmed to color 506, whereas color cell 514 is still unprogrammed. The programming application may indicate which color cells have been programmed, which have been selected for programming, and which ones still require programming by displaying the programming pattern and programming indicator on the vehicle model as described in FIGS. 1A-1B.

User interface 500 may also include selectable icons corresponding to different editing commands for the active vehicle surface. When a user selects painting icon 516, the vehicle's active surface controller causes the active vehicle surface to enter color programming mode. In some embodiments, the user has already selected a color from color selection interface 504 before selecting painting icon 516. In this case, the active vehicle surface displays the programming pattern indicating that all color cells are ready to receive user interactions. The user can then interact with the vehicle and cause color cells to be programmed to the selected color by interacting with surface of the vehicle. For example, the user may perform a swiping movement across the surface of the vehicle thus simulating an actual painting of the vehicle for the user. In some embodiments, painting icon 516 may also include an option to adjust the area of cells that get programmed around the interaction point of a user action, thus allowing the user to adjust the paintbrush size of their interactions. This enables the user to program a wide area of color cells without the user having to interact with them with another user action. In some embodiments, the user has not selected a color from color selection interface 504 before selecting painting icon 516. In this case, the color programming application may send an indication to the user that they must select a color from color selection interface 504. In some embodiments, a user can select a color cell for programming after they select painting icon 516 and then select a color that the selected color cell should be programmed to as described in FIG. 1B. When a user selects bucket icon 518, a user may interact with a perimeter of cells to color in the entire area of the cell perimeter they selected. This enables a user to program a large area of the vehicle surface with minimal inputs. For example, the user may swipe their hand around a vehicle panel (e.g., a fender or hood) thus causing the vehicle panel to be programmed with a color based on the one user input. In some embodiments, this feature is also enabled when the user selects painting icon 516.

When a user selects undo icon 522, the vehicle's active surface controller is instructed to undo the last change made on the active vehicle surface. In some embodiments, exit icon 524 may enable a user to exit color programming mode, cause the active vehicle surface to revert to a default color, cause the active vehicle surface to revert to the previously saved color pattern, or any combination thereof. Save icon 526 may enable a user to save the current color pattern of the active vehicle surface in storage. In some embodiments, save icon 526 may also enable the user to share the color pattern with other users. This allows users to receive color patterns configured by other people and easily lets them apply the received color patterns to the active vehicle surfaces of their own vehicles. Storage icon 528 may enable a user to access previously saved color patterns (e.g., stored in storage A 812, storage B 814 and/or database 818 of FIG. 8) to subsequently edit them, delete them, or program them to the active vehicle surface, or any combination thereof.

Figure 6:
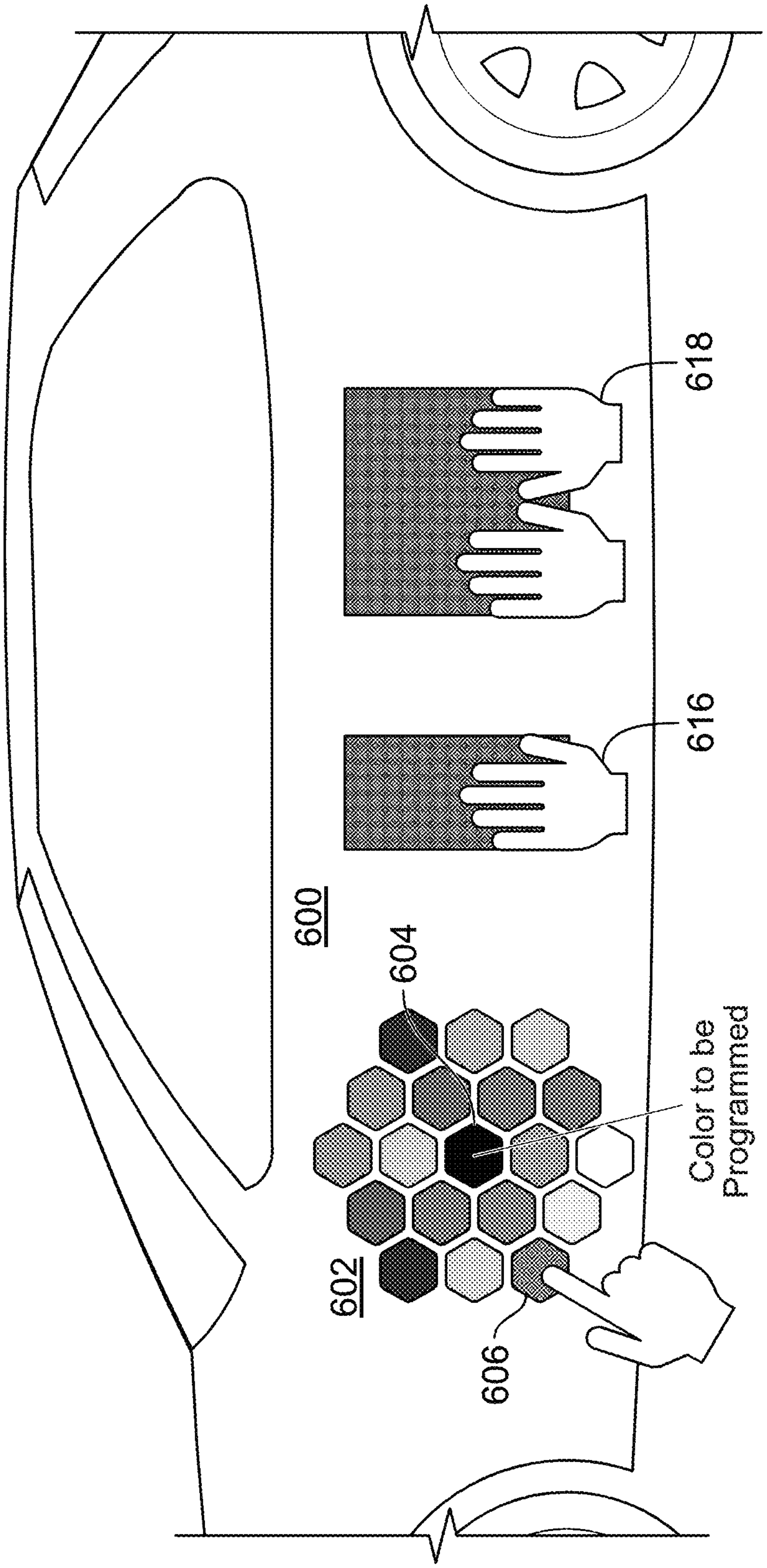
FIG. 6 shows illustrative user interfaces displayed on the active vehicle surface for receiving a color a selection, editing adjustments, and selecting color cell, in accordance with embodiments of the disclosure.

FIG. 6 shows illustrative user interfaces displayed on the active vehicle surface for receiving a color selection, editing adjustments and color cell selections, in accordance with embodiments of the disclosure. As shown on vehicle panel 600, the active vehicle surface may enable the user to interact directly with the active vehicle surface to make color selections. For example, the vehicle's active surface controller may receive a request to program the color of color cell 604. In response to receiving the request, the vehicle's active surface controller may create color selection interface 602 by temporarily programming the cells around color cell 604 to display all the color options. The user may then select a cell (e.g., color cell 606) temporarily programmed with the desired color to indicate to the vehicle's active surface controller which color to program color cell 604 to. After programming color cell 604 to the desired color, the active vehicle surface may then reprogram the cells around color cell 604 to their previous color or to the color/animation of the programming pattern. In some embodiments, the number of available colors may exceed the total number of programmable cells or the total number of programmable cells reachable by the user. In this case, certain user gestures may allow the color cells to cycle through various color combinations in order to view all possible colors with a limited amount of color cells.

In some embodiments, if cell resolution of the vehicle's active surface is high enough, the vehicle's active surface controller (e.g., active surface controller 906 of FIG. 9) may also program the active vehicle surface (e.g., active vehicle surface 926 of FIG. 9) to display selectable icons corresponding to the different editing commands for the active vehicle surface. For example, the active vehicle surface may display selectable icons with the same functionality as the selectable icons described in FIG. 5

In some embodiments, the vehicle active surface controller may vary the amount of color cells that are programmed in response to a user interaction based on the gesture that is determined by the control circuitry (e.g., graphics processing unit 914 of control circuitry 904 and/or graphics processing unit 942 of control circuitry 934 as shown in FIG. 9). As discussed in FIG. 2, the control circuitry may utilize gesture detection algorithms configured to detect the number of hands, each hand having a certain number of fingers extended, a certain direction of motion, a certain position, a threshold distance to the vehicle surface, any other suitable property, or any combination thereof and identify them with a user action. In some embodiments, the hand gesture determined by the control circuitry may indicate to the active vehicle surface how many color cells to program in response to a user interaction. For example, as shown by gesture 616, a user may interact with the active vehicle surface by swiping down vehicle panel 600 with one hand extended. In response to the control circuitry determining that the swipe is a one-hand interaction, the vehicle's active surface controller programs a narrow strip of color cells along the path of the hand swipe corresponding to gesture 616. In some approaches, the narrow strip matches the width of the hand or fingers, the width allowed by the area of the color cells, the width allowed by the programming of the vehicle's active surface controller, a minimum width set by the color programming application, or any other suitable approach.

As shown by gesture 618, a user may interact with the active vehicle surface by swiping down vehicle panel 600 with two hands extended. In response to the control circuitry determining that the swipe is a two-hand interaction, the vehicle's active surface controller programs a broader strip of color cells along the path of the finger swipe corresponding to gesture 618. In some approaches, the broad strip matches the width of the hand or fingers, the width allowed by the area of the color cells, the width allowed by the programming of the vehicle's active surface controller, a maximum width set by the color programming application, or any other suitable approach. In some approaches, the user can increase the area of color cells affected by their interaction by increasing the number of fingers to three, four, and five. This allows the active vehicle surface to simulate as accurately as possible paintbrush affect for the user, such that the digital changes on the active vehicle surface match the physical interaction that caused them. In some embodiments, other gestures such a closed fist, crossed fingers, spread out fingers, waving hands, pointing hands, any other suitable gestures, or any combination thereof, may also correspond to specific actions executed by the control circuitry. For example, users may program certain gestures to correspond to the different editing commands (e.g., the color commands represented by the selectable icons of FIG. 5 and FIG. 6), such as showing a closed fist to save the current colors of the active vehicle surface in storage.

Figure 7:
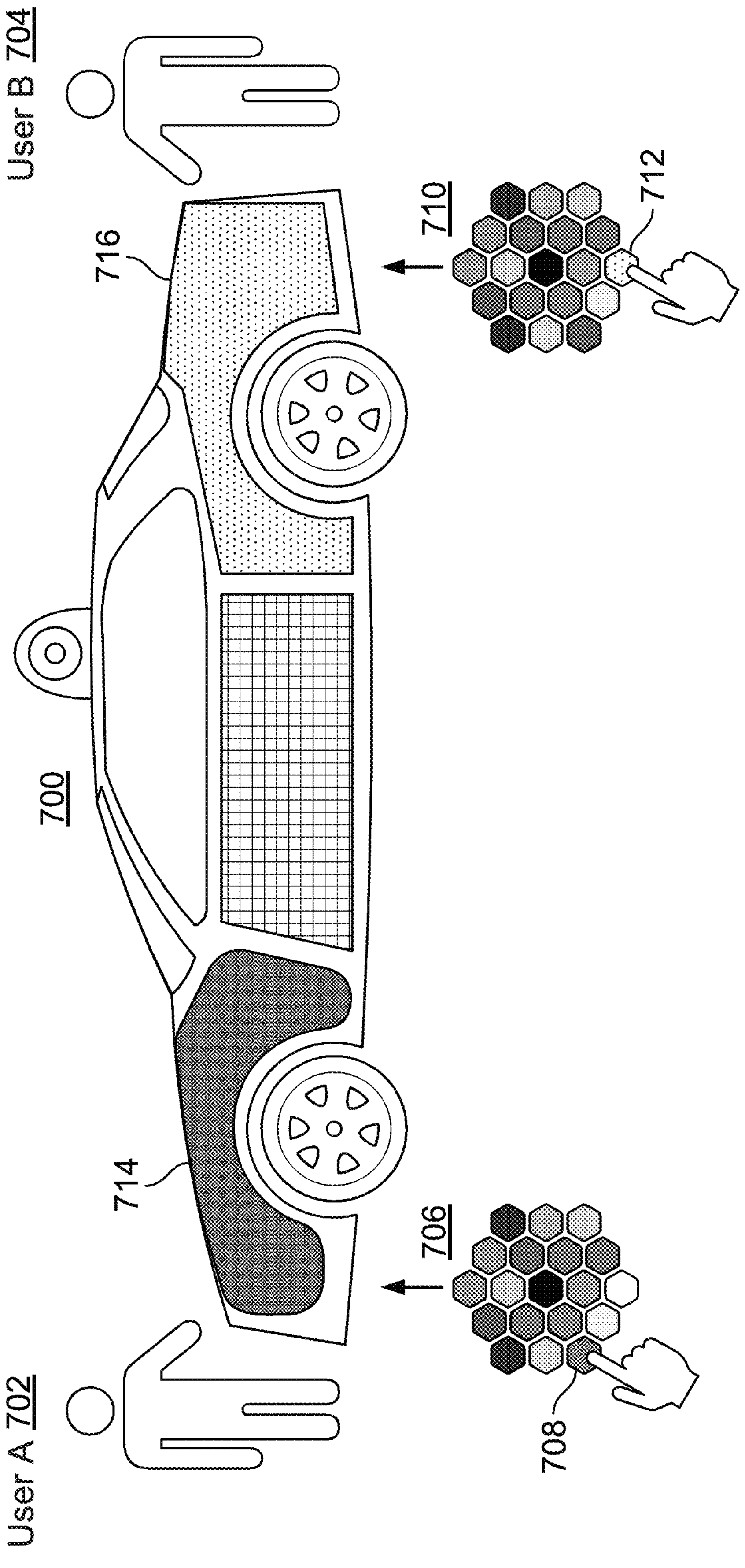
FIG. 7 is a schematic illustration for multiple users simultaneously interacting with the active vehicle surface, in accordance with embodiments of the disclosure.

FIG. 7 shows is a schematic illustration for multiple users simultaneously interacting with the active vehicle surface, in accordance with embodiments of the disclosure. As shown in FIG. 7, User A 702 and User B 704 may be interacting with the active vehicle surface (e.g., active vehicle surface

926 of FIG. 9) of vehicle 700. Each user has selected a unique color to customize the vehicle surface with. For example, User A 702 has selected Color A 708 on color selection interface A 706, whereas User B 704 has selected Color B 712 on color selection interface B 710. User A 702 interacts with color cell 714 and User B interacts with 716. Based on User A 702 interacting with color cell 714, the vehicle's active surface controller (e.g., active surface controller 906 of FIG. 9) programs color cell 714 to User A 702's respective color selection, Color A 708. Based on User B 704's interacting with color cell 716, the vehicle's active surface controller programs color cell 716 to User B's 704 respective color selection, Color B 712. As referred to herein, "collaborative painting mode" may correspond to the described system of users being enabled to simultaneously interact with the active vehicle surface. Collaborative painting mode allows a user to work together with other nearby users without any user actions conflicting with one another.

In some embodiments, collaborative painting mode involves more than one device. The vehicle's active surface controller may detect the proximity of a main device already permitted to paint the vehicle and may issue additional temporary permissions to paint the vehicle to additional devices also detected in the proximity of the main device. For example, User A 702 may possess the main device. The main device may be running the vehicle customization application and be displaying color selection interface 706. User B 704 may possess the additional device. The additional device may also be running the vehicle customization application and be displaying color selection interface 710. After each user has selected their desired color, the monitoring system (e.g., a system comprising sensor(s) and/or camera(s) such as those described below in connection with FIG. 9) may individually detect user actions from each user. The control circuitry (e.g., graphics processing units 914, 942 and/or sensor fusion processing units 916, 944 of control circuitries 904, 934 respectively as shown in FIG. 9) may then use gesture detection, face detection, object detection, or any combination thereof to then match each detected user action to a user and/or their device. Matching user actions to the user and/or their device allows the control circuitry (e.g., central processing unit 912 of control circuitry 904 and/or central processing unit 938 of control circuitry 934 as shown in FIG. 9 to instruct the vehicle's active surface controller to simultaneously program different parts of the vehicle surface with unique colors, each corresponding to a user and their respective color selection. A variety of users can therefore collaborate on coloring the vehicle surface without possibly interfering with the color changes that other users want to make.

In some embodiments, collaborative painting mode involves no devices. Rather, the vehicle's active surface controller displays multiple color selection interfaces (e.g., color selection interfaces 706, 710) on the active vehicle surface. The monitoring system (e.g., may individually detect each user selection, and the control circuitry (e.g., graphics processing unit 914 of control circuitry 904 and/or graphics processing unit 942 of control circuitry 934 of FIG. 9) uses gesture detection, face detection, object detection, or any combination thereof to then associate each user selection with a specific user around the vehicle. The system therefore achieves the same non-interfering collaborative environment as described above, but without the need for individual devices for each user.

In some approaches, the collaborative painting mode may include a temporary painting mode setting in which temporary authorization to color the vehicle is granted to all devices in proximity to the vehicle. In that mode, painting takes place as described above, but the vehicle paint is reset to the state it was in prior to the temporary painting authorization, once it is placed back into drive mode (i.e., motor on). This allows vehicle owners to set their vehicle in a state that can quickly be used for recreation with other users. Users may still have the option to store temporary patterns so that they can be reapplied to the active vehicle surface in the future.

Figure 8:
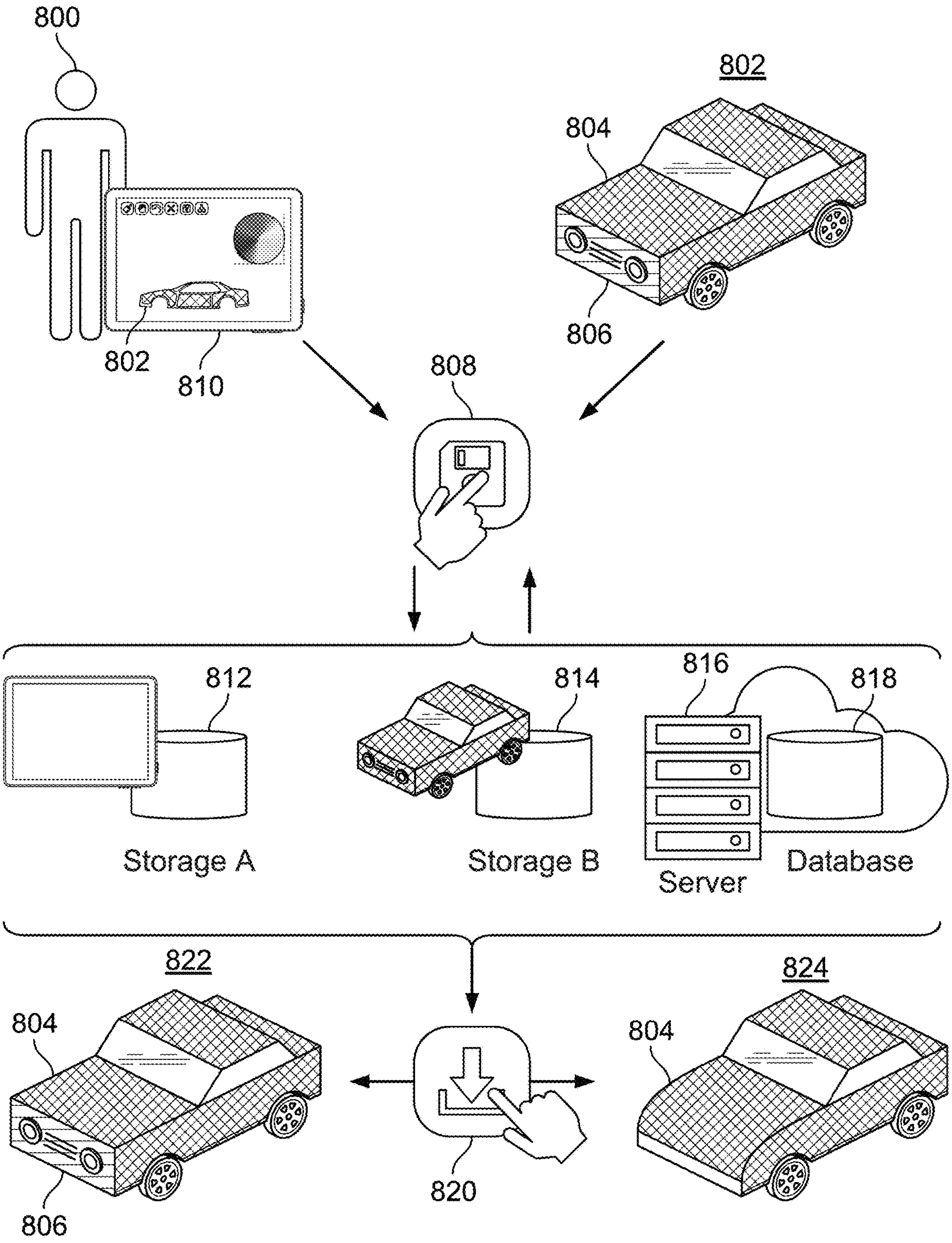
FIG. 8 shows a schematic illustration demonstrating how users can store and save their custom vehicle surface patterns, in accordance with embodiments of the disclosure.

FIG. 8 shows a schematic illustration demonstrating how users can store and save their custom vehicle surface patterns, in accordance with embodiments of the disclosure. When users have created a color pattern, they may want to have the option to save it in storage and maybe even share it with other users who might want to apply it to their own vehicles. As shown in FIG. 8, user 800 has programmed the active surface (e.g., active vehicle surface 926 of FIG. 9) of their vehicle with color pattern 802, including pattern component A 804 applied to the hood, fender, doors, roof, and trunk of the vehicle and pattern component B 806 applied to the bumper of the vehicle. In some embodiments, after completing their color pattern, the user can store the color pattern. For example, the user can select save icon 808 to instruct the active vehicle system to store color pattern 802. In some embodiments, the user may prompt the active vehicle system to store color pattern 802 by using the color programming application running on a user device (e.g., as shown here by selecting save icon 808 on user device 810 of FIG. 8 or similarly by selecting save icon 526 on user device 502 of FIG. 5). In some approaches, the user device is a mobile device (e.g., a phone or tablet), a computer, an XR device (e.g., a VR headset) the vehicle key, the vehicle infotainment system, the vehicle active surface or any other suitable device.

After user 800 has requested color pattern 802 to be stored, the active vehicle surface system may store color pattern 802 in storage. In some embodiments, the active vehicle surface system may store color pattern 802 in storage A 812 (e.g., corresponding to storage 940 of FIG. 9) integrated into a user device (e.g., user device 810). Such embodiments enable the user to access and preview their saved color patterns even if they are not near their vehicle. By storing the color patterns on the user device, a user can program a color pattern on one vehicle, store it on their user device, and take it to other vehicles that they might want to apply the color pattern to. Furthermore, if the user is an area without a stable network connection, they can still use their user device to program saved color patterns onto their vehicle.

In some approaches, the active vehicle surface system may store color pattern 802 in storage B 814 (e.g., corresponding to storage 908 of FIG. 9) integrated into the user's vehicle.

Such approaches allow a user to not have a specific user device in their possession when wanting to program the active vehicle surface to a saved color pattern. Furthermore, if the user is an area without a stable network connection, they can still access their vehicle storage to program saved color patterns onto their vehicle.

In some embodiments, the active vehicle surface system may send color pattern 802 to server 816 to be stored in database 818. Such approaches allow a user to not have a specific user device in their possession or be using a specific vehicle when wanting to program an active vehicle surface to a saved color pattern. Furthermore, by storing the saved color patterns at a server, other users can access each other's saved color patterns without being in proximity of one another. In some approaches, a user can choose to simultaneously store a color pattern in multiple of the shown storage spaces (i.e., storage A 812, storage B 814, or database 818).

In some approaches, users can access their saved color patterns from any of the storage spaces (i.e., storage A 812, storage B 814, or database 818) and apply them to another vehicle. For example, the user may select storage icon 820 to request the vehicle's active surface controller to apply a saved color pattern. In some embodiments, storage icon 820 may be displayed on the interface of the color programming application (e.g., such as storage icon 528 of FIG. 5) running on, e.g., a mobile device or the vehicle's infotainment system After selecting storage icon 820, the user may be prompted to select one of the color patterns they have saved to one or more of the storage spaces. Once they have selected a saved color pattern, program the pattern to the active vehicle surface. For example, user 800 may want to program color pattern 802 to vehicle A 822 and vehicle B 824. Vehicle A 822 is the same model as the model that the color pattern was programmed on; therefore, the vehicle's active surface controller can program both pattern component A 804 and pattern component B 806 to their respective color cells of the vehicle. In some embodiments, the saved color pattern may be altered to match the capabilities of the vehicle the user would like to program the saved color pattern to. For example, vehicle B 824 is not the same model as the model that the color pattern was programmed on and may, e.g., not have a color programmable bumper required to display pattern component B 806. The vehicle's active surface controller (e.g., active surface controller 906 of FIG. 9) may therefore not display pattern component B 806 when color pattern 802 is programmed onto it or may display pattern component B 806 on another part of the vehicle (e.g., the lower part of the vehicle's hood). In some embodiments, altering a color pattern may include color reduction, dithering, pattern transformation, pattern cropping, pattern warping, any other suitable alteration, or any combination thereof.

In some approaches, the storage spaces (i.e., storage A 812, storage B 814, or database 818) may be utilized for a rideshare service provider. In such embodiments, a rider may request a ride and be able to transmit their saved color pattern to the rideshare vehicle in order to easily identify them upon arrival. In some embodiments, companies may have their own storage spaces and servers that can transmit new advertisements and/or announcements to a fleet of vehicles. In some embodiments, the user can connect the storage spaces to a rental vehicle service and change the color pattern of their rental vehicle upon receiving the vehicle.

FIG. 9 is a block diagram of an illustrative example of vehicle architecture 900, in accordance with embodiments of the disclosure. More specific implementations of user equipment devices are discussed above and below in connection with FIG. 9. Vehicle architecture 900 may send and receive data via input/output (I/O) path 902. I/O path 902 may provide data to control circuitry 904, which includes active surface controller 906, central processing unit 912 (CPU), graphics processing unit 914 (GPU), sensor fusion processing unit 916 (SFPU), and storage 908. Control circuitry 904 may be used to send and receive commands, requests, and other suitable data using I/O path 902. For example, control circuitry may use I/O path 902 to send requests to store and/or retrieve color patterns stored at storage A 812 of a user device or server 816 of FIG. 8.

Control circuitry 904 may be based on any suitable processing circuitry such as CPU 912, GPU 914, and SFPU 916. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units (e.g., CPU 912, GPU 914, and SFPU 916). The demonstrated processing units of control circuitry 904 are an exemplary layout for a user equipment that can achieve the tasks of the disclosed invention. Any suitable embodiment, of control circuitry configurations and components may be used. In some embodiments control circuitry 904 executes instructions for a color programming application stored in memory (i.e., storage 908). Specifically, control circuitry 904 may be instructed by the color programming application to perform the functions discussed above and below. For example, the color programming application may provide instructions to control circuitry 904 to generate a color selection interface for the active vehicle surface. In some implementations, any action performed by control circuitry 904 may be based on instructions received from the color programming application.

In client/server-based embodiments, control circuitry 904 may include communications circuitry suitable for communicating with networks or servers (e.g., server 816 of FIG. 8). The instructions for carrying out the above-mentioned functionality may be stored on a server.

Communications circuitry may include an Ethernet card or a wireless modem for communications with other equipment, or any other suitable communications circuitry. Such communications may involve the internet or any other suitable communication network or paths (which are described in more detail in connection with FIG. 10). In addition, communications circuitry may include circuitry that enables peer-to-peer communication of user equipment devices (described in more detail in description of FIG. 10), or communication of user equipment devices in locations remote from each other.

In some embodiments, an antenna array 922 is provided in the vehicle architecture 900. Antenna array 922 may comprise one or more of AM/FM radio antennas, satellite radio antennas, GPS antennas, Wi-Fi or cellular antennas, radar/sensor antennas, keyless entry antennas, or Bluetooth antennas.

Memory may be an electronic storage device provided as storage 908 that is part of control circuitry 904 (often referred to as an electronic control unit, or ECU). As referred to herein, the phrase "electronic storage device" or "storage device" should be understood to mean any device for storing electronic data, computer software, or firmware, such as random-access memory, read-only memory, hard drives, optical drives, solid state devices, quantum storage devices, or any other suitable fixed or removable storage devices, and/or any combination of the same. Storage 908 may be used to store various types of content described herein. Nonvolatile memory may also be used (e.g., to launch a boot-up routine and other instructions). Cloud-based storage may be used (e.g., such as database 818 of FIG. 8).

The active vehicle surface 926 consists of panels that can be independently controlled by active surface controller 906. In some embodiments, the panels may comprise miniscule pixels or microcapsules. In some approaches, the microcapsules are filled with colored particles that carry electrical charges, thus allowing the color of active vehicle surface 926 to be changed by modifying the electric charge of each point. The active surface controller 906 may control the color of the active vehicle surface 926 by changing the electrical charges of each point. While in some implementations, the active vehicle surface 926 comprises only one or two independently controlled active surfaces, in other implementations, the active vehicle surface 926 comprises many independently controlled active surfaces, each of which is color-programmable by the active surface controller 906. In some embodiments, each independently controlled active surface has constraints on the number of colors it can depict.

In one embodiment, speakers 924 may be provided as integrated with other elements of vehicle architecture 900 or may be stand-alone units. The audio, or any other content displayed on display 918, may be played through speakers 924.

Sensor(s) 926 are used to monitor, identify, and determine vehicular and environment data. For example, the color programming application may receive spatial mapping data from the sensor(s) 930 or any other vehicular status data (e.g., global positioning data of the vehicle, driving condition of the vehicle, etc.) received from any other vehicular circuitry and/or component that describes the vehicular status of the vehicle. Cameras 928 are used to capture images of the surrounding environment of the vehicle. In some embodiments, the cameras are provided as integrated with other elements of vehicle architecture 900.

A color programming application may be implemented using any suitable architecture. For example, it may be a stand-alone application wholly implemented on vehicle architecture 900. In such an approach, instructions of the application are stored locally (e.g., in storage 908), and data for use by the application is downloaded on a periodic basis (e.g., from an out-of-band feed, from an internet resource, or using another suitable approach). Control circuitry 904 may retrieve instructions of the application from storage 908 and process the instructions to generate any of the interfaces discussed herein. Based on the processed instructions, control circuitry 904 may determine what action to perform when input is received from user input interface 920. For example, movement of a cursor on a user interface (e.g., user interface 500 of FIG. 5) element may be indicated by the processed instructions received from user input interface 920.

In some embodiments, the color programming application is a client/server based application. Data for use by a thick or thin client implemented on vehicle architecture 900 is retrieved on demand by issuing requests to a server remote to the vehicle architecture 900. In one example of a client/server based content application, control circuitry 904 runs a web browser that interprets web pages provided by a remote server. For example, the remote server may store the instructions for the application in a storage device. The remote server may process the stored instructions using circuitry (e.g., control circuitry 904) and generate the displays discussed above and below. The client device may receive the displays generated by the remote server and may display the content of the displays locally on vehicle architecture 900. This way, the processing of the instructions is performed remotely by the server while the resulting displays are provided locally on vehicle architecture 900. Vehicle architecture 900 may receive inputs from the user or occupant of the vehicle via user input interface 920 and transmit those inputs to the remote server for processing and generating the corresponding displays. For example, vehicle architecture 900 may transmit, via antenna array 922, a communication to the remote server indicating that a user interface element was selected via user input interface 920. The remote server may process instructions in accordance with that input and generate a display of content identifiers associated with the selected user interface element. The generated display is then transmitted to vehicle architecture 900 for presentation to the user or occupant of the vehicle.

In some embodiments, the color programming application is downloaded and interpreted or otherwise run by an interpreter or virtual machine (executed by control circuitry 904). In some embodiments, the color programming application may be encoded in the Enhanced TV Binary Interchange Format (EBIF), received by control circuitry 904 as part of a suitable feed, and interpreted by a user agent running on control circuitry 904. For example, the color programming application may be an EBIF application. In some embodiments, the color programming application may be defined by a series of JAVA-based files that are received and run by a local virtual machine or other suitable middleware executed by control circuitry 904.

Figure 10:
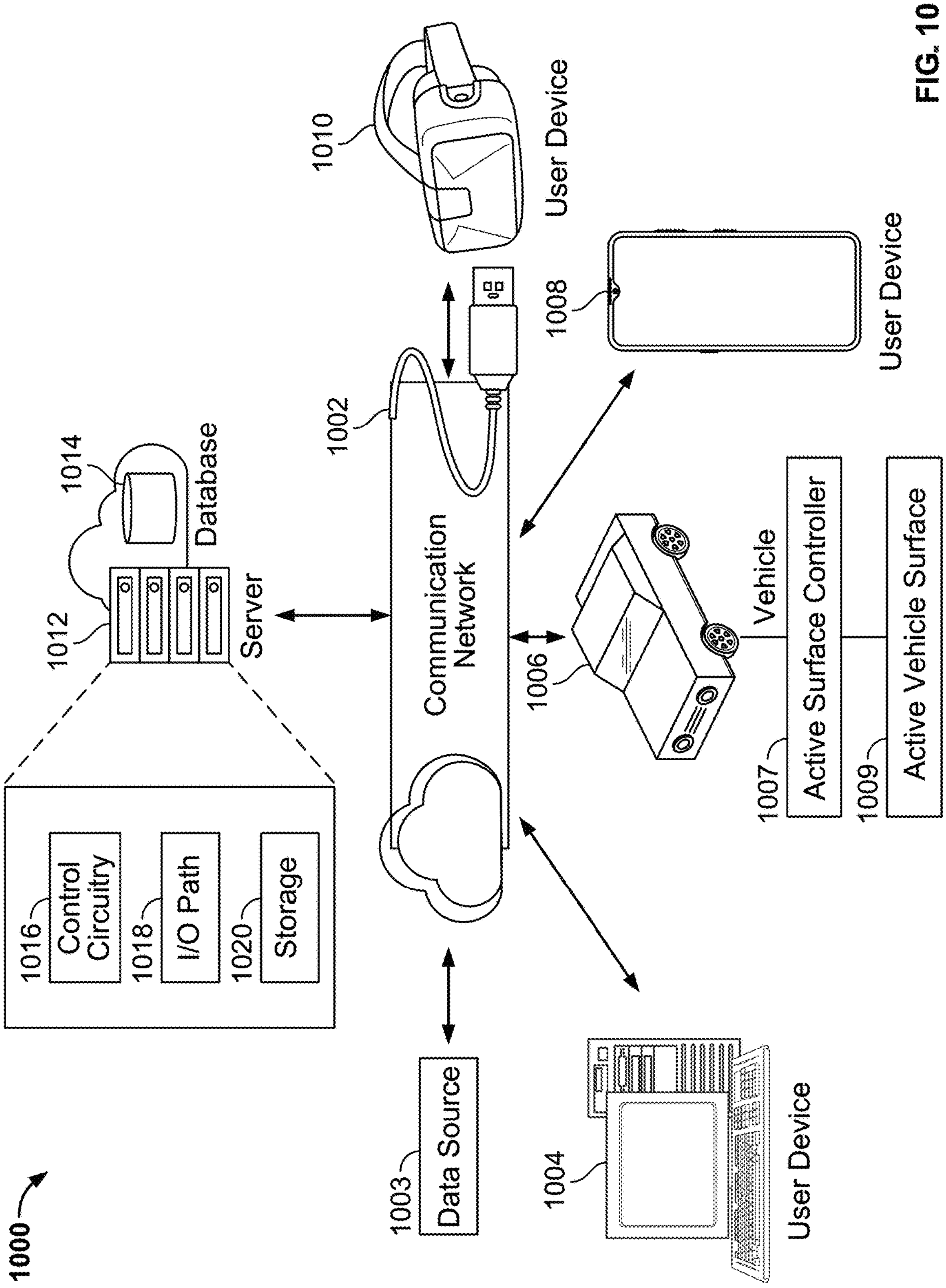
FIG. 10 is an example of an illustrative system implementing the user equipment device, in accordance with embodiments of the disclosure.

Vehicle architecture 900 of FIG. 9 can be implemented in system 1000 of FIG. 10 as vehicle 1006. User equipment device 932 user devices 1004, 1008, 1010, vehicle 1006 or any other type of user equipment suitable for accessing content. For simplicity, these devices may be referred to herein collectively as user equipment or user equipment devices and may be substantially similar to user equipment devices described above. User equipment devices may function as stand-alone devices or may be part of a network of devices. Various network configurations of devices may be implemented and are discussed in more detail below.

In some embodiments, the system may also include user equipment device 932. The demonstrated architecture of user equipment device 932 is another exemplary layout for a user equipment that can achieve the tasks of the disclosed invention. User equipment device 932 may be configured to have many of the same features and complete similar tasks to vehicle architecture 900. For example, the color programming application may also be implemented on user equipment device 932 which may be communicatively coupled to vehicle architecture 900. A user may begin programming mode and/or make color selections using user input interface 948. When control circuitry 934 processes an input from the user using the color programming application it may transmit a command corresponding to that input to vehicle architecture 900 using Antenna Array 950. In some embodiments, the color programming application may use camera(s) 954 and sensor(s) 956 to capture spatial mapping data and other environment data around the vehicle.

FIG. 10 is an example of an illustrative system implementing the user equipment device, in accordance with embodiments of the disclosure. A user equipment device utilizing at least some of the system features described above in connection with FIG. 10 may not be classified solely as vehicle 1006 or a user device 1004, 1008, 1010. For example, vehicle 1006 may be remotely controlled via user devices 1004, 1008, 1010.

The user equipment devices may be coupled to communication network 1002. Communication network 1002 may be one or more networks including the internet, a mobile phone network, mobile voice or data network (e.g., a 4G, 5G or LTE network), a vehicle-to-vehicle (V2V) network, or other types of communication networks or combinations of communications networks.

System 1000 includes data source 1003 and user devices 1004, 1006, 1008, 1010 coupled to communication network 1002. Communications with the data source 1003 and the user equipment devices may be exchanged over one or more communication paths. In some embodiments, the user equipment devices exchange communications with the computer equipment of other nearby vehicles over one or more communication paths.

Data source 1003 may include one or more types of content distribution equipment including a media distribution facility, satellite distribution facility, programming sources, intermediate distribution facilities and/or servers, internet providers, on-demand media servers, and other content providers. In some embodiments, the user equipment devices access the data source 1003 to receive color programming data. In some approaches, data source 1003 may be any suitable server configured to provide any information needed for operation of the user equipment devices as described above and below (e.g., in FIGS. 1-9). For example, data source 1003 may provide weather information, environment information, data about vehicle capabilities, and/or any other suitable data needed for operations of user equipment devices (e.g., as described in FIGS. 1-9). In some implementations, color programming data may be provided to the user devices 1004, 1008, 1010 or vehicle 1006 from the data source 1003, which can be done using any suitable approach (e.g., a client/server approach). For example, the user equipment devices may pull content data from a server, or a server may present the content data to the user equipment devices. Data source 1003 may provide the user equipment devices the color programming application itself or software updates for the color programming application.

In some embodiments, the user equipment devices, which include the control circuitry 904, the I/O path 902, and storage 908, communicate over the communication network 1002 with a server 1012 to send and receive vehicle diagnostic data (e.g., data related to the vehicle's performance and internal systems, safety-related data (e.g., data related to vehicle speed or braking, especially in the event of a collision), GPS and map data, trained machine learning models the user equipment devices implements (e.g., analyzing external environment, or processing images), stored active vehicle surface color patterns, and any other necessary data. In some approaches, the user equipment devices send data (e.g., data collected from vehicular sensors or saved color patterns) back to server 1012, which server 1012 stores in database 1014. The process of sending vehicle data to and receiving vehicle data from a server is further described in FIG. 8.

Active surface controller 1007 controls the color of active vehicle surface 1009. To change the color of the active vehicle surface, the active surface controller 1007 receives instructions from the user equipment devices. In some embodiments, a user equipment device receives a color selection for a color to modify active vehicle surface 1009 to and instructs the active surface controller 1007 to modify the color of the active vehicle surface to the selected color. For example, a color-changing exterior surface may be an e-ink layer applied to surface of a vehicle, and active surface controller 1007 may be the controller for the states of the e-ink layer. In some implementations, the active surface controller 1007 requires a large amount of energy to change or maintain patterns on the color-changing exterior surface. Active surface controller 1007 tracks the amount of energy required to change or maintain the pattern and communicates with user equipment devices to optimize the energy cost associated with changing or maintaining patterns on active vehicle surface 1009. As an example, if, while a vehicle is parked, a large amount of energy is required to maintain a specific pattern (e.g., a dynamic pattern) on active vehicle surface 1009, the active surface controller 1007 may activate a separate, pattern for use when the vehicle is parked that reduces the energy cost. In some embodiments, the vehicle computer equipment receives a GPS location of the driver's user equipment device (e.g., a smartphone), and instructs active surface controller 1007 to de-activate the parked pattern and re-activate the user or occupant's selected pattern when the driver's GPS location is nearby the location of the parked vehicle. In some approaches, active surface controller 1007 instructs the active vehicle surface to de-activate the parked pattern and re-activate the user or occupant's selected pattern when the sensor(s) and/or cameras (e.g., sensor(s) 930, 956 and camera(s) 928, 954 as shown in FIG. 9) of the user equipment device (e.g., the vehicle) detect the user within a vicinity threshold. In some approaches, the user equipment devices select a pattern that makes the vehicle more visible to its user. In other embodiments, the user equipment devices select a pattern that allows the user to quickly verify a state of the vehicle (e.g., whether or not the vehicle is in a locked state).

Figure 11:
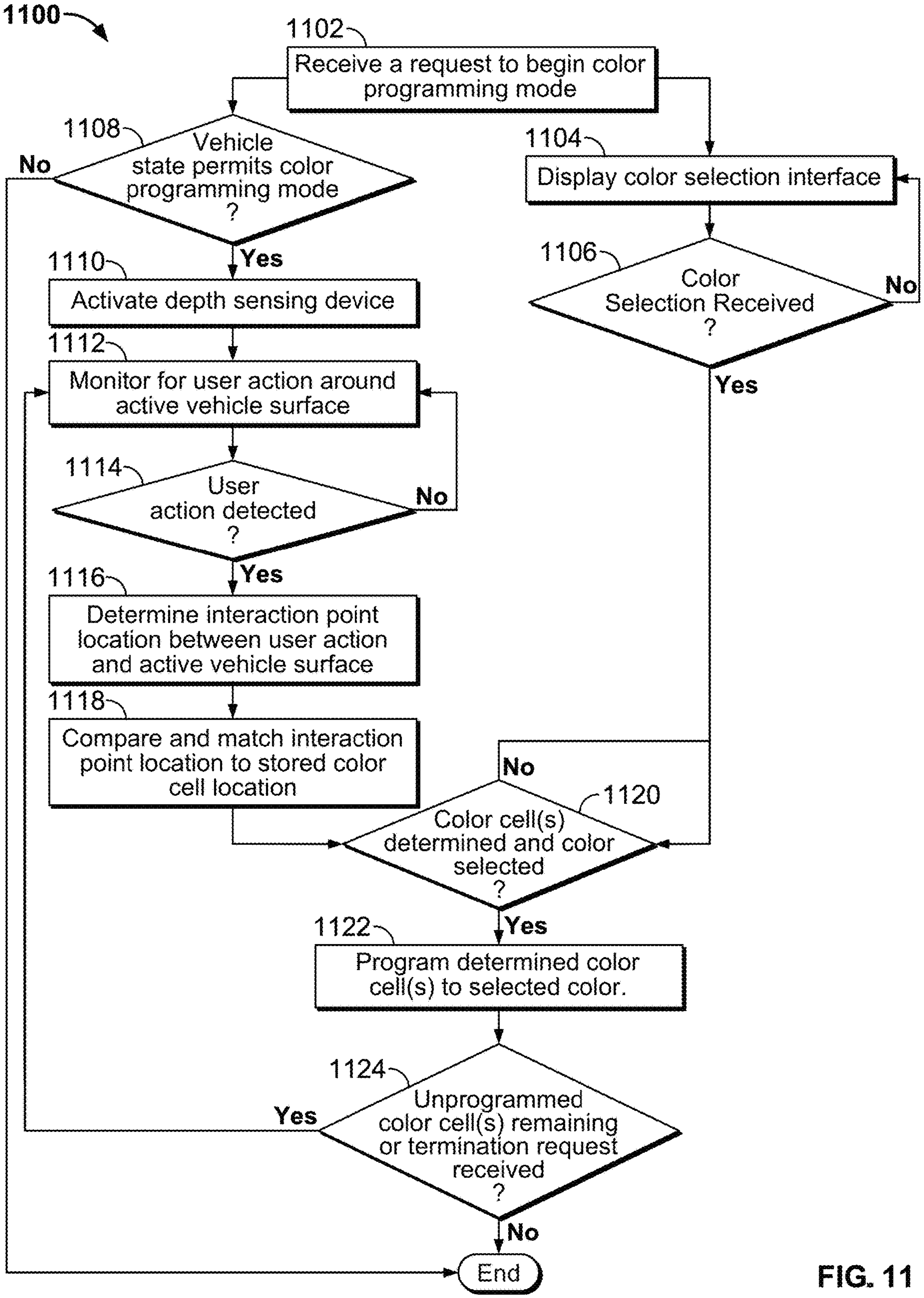
FIG. 11 is an illustrative flowchart for a process for modifying the color of the active vehicle surface, in accordance with embodiments of the disclosure.

FIG. 11 is an illustrative flowchart for a process for modifying the color of the active vehicle surface, in accordance with embodiments of the disclosure. In various embodiments, the individual steps of process 1100 may be implemented by one or more components of the devices and systems of FIGS. 1-10. Although the present disclosure may describe certain steps of process 1100 (and of other processes described herein) as being implemented by certain components of the devices and systems of FIGS. 1-10, this is for purposes of illustration only, and it should be understood that other components of the devices and systems of FIGS. 1-10 may implement those steps instead.

Process 1100 begins at step 1102, where control circuitry (e.g., control circuitry 904 of FIG. 9), receives a request to begin color programming mode on an active vehicle surface (e.g., active vehicle surface 926 of FIG. 9). For example, the request to begin color programming mode may be prompted by the user launching the color programming application (e.g., an interface of the color programming mode demonstrated by user interface 500) or the user performing a user action towards or on the vehicle surface. In some embodiments, the ability to request and access color programming mode is protected by digital security measures. Access may be protected by password, shared secrets or proximity of a smart device of a registered user of the vehicle.

Process 1100 then continues to steps 1104 and 1106. In step 1104, control circuitry (e.g., control circuitry 904 of FIG. 9) displays (e.g., on display 918 and/or display 946 of FIG. 9) the color selection interface. Color selection interface 104 may comprise a grid of colors, a list of colors, a color wheel, an input field for RGB values, any other suitable color selection interface, or any combination thereof. In some embodiments, the color selection interface may be displayed on a device running the color programming application. For example, in some embodiments, the color selection interface may be displayed on a user's personal device (e.g., user device 810 of FIG. 8) running the color programming application. In some embodiments, the color programming application may run on a mobile device, a computer, an XR device, the vehicle key, the vehicle infotainment system, the vehicle active surface or any other suitable device. In some approaches, the color selection interface is displayed directly on the active vehicle surface (e.g., as depicted on vehicle panel 600 of FIG. 6). At step 1106, the control circuitry determines whether a color selection has been received, e.g., by the user selecting a color from color selection interface 504 of FIG. 5 or color selection interface 602 of FIG. 6. If the control circuitry has not received a color selection, it continues to perform step 1104 and displays the color selection interface.

During the execution of steps 1104 and 1106, control circuitry (e.g., control circuitry 904 of FIG. 9) concurrently performs step 1108 and determines whether the vehicle's current operation state permits color programming mode. For example, if the vehicle's operation mode is currently in drive mode, the color programming mode may not be activated to prevent endangering the user. Step 1104 may end if the vehicle is in an operation mode that prevents color programming mode and may begin again at step 1102 when a user re-requests the vehicle to begin color programming mode. In some approaches, control circuitry may display a prompt instructing the user to change the vehicle's operation mode to enable to process 1100 to continue. In some embodiments, an operation mode like parked mode or power off mode is designated as a vehicle operation state that permits color programming mode.

If the vehicle is in an operation mode that permits color programming mode, process 1100 continues to step 1110. In step 1110 control circuitry (e.g., control circuitry 904 of FIG. 9) activates a depth-sensing device (e.g., a system comprising sensor(s) 930, 956 and camera(s) 928, 954). In some embodiments, the depth-sensing device may be implemented on the vehicle as shown by monitoring system 310 of FIG. 3. In some approaches, the depth-sensing device may be implemented on a user device as shown by the monitoring system of FIG. 4B represented by sensors 420, 422 of an XR device. In some embodiments, the depth-sensing device may be a set of optical sensors (e.g., cameras, LIDAR, etc.), proximity sensors, IR sensors, motion sensors, ultrasonic sensors, any other suitable sensor, or any combination thereof.

After activating the depth-sensing device, process 1000 continues to step 1112, where control circuitry (e.g., control circuitry 904 of FIG. 9) utilizes the depth-sensing device (e.g., a system comprising sensor(s) 930, 956 and camera(s) 928, 954) to monitor for a user action around the active vehicle surface. For example, the depth-sensing device may monitor for a user touching a portion of the active vehicle surface (e.g., as shown by user action 204 of FIG. 2 and user action 306 of FIG. 3). In some embodiments, the depth-sensing device may also monitor for a user action corresponding to a user pointing, gesturing, looking, any other suitable action (e.g., as shown by user action 426 of FIG. 4B), or any combination thereof.

At step 1114, control circuitry (e.g., control circuitry 904 of FIG. 9) determines whether the depth-sensing device (e.g., a system comprising sensor(s) 930, 956 and camera(s) 928, 954) has detected a user action. In some embodiments, control circuitry (e.g., GPUs 914, 942 and/or SFPUs 916, 944 of control circuitry 904, 934 respectively, as shown in FIG. 9) may use gesture detection, face detection, object detection, or any combination thereof to detect a user action. If no user action has been detected by the depth-sensing device, process 1100 reverts back to step 1112 and continues to monitor for a user action.

If the depth-sensing device detects a user action, process 1100 proceeds to step 1116. In step 1116, control circuitry (e.g., control circuitry 904 of FIG. 9) determines a location of the interaction point between the user action and the active vehicle surface. In some embodiments, the interaction point may be a point where the user touches the active vehicle surface, e.g., by the user pressing a finger or hand against the active vehicle surface (e.g., as shown by user action 204 of FIG. 2 and user action 306 of FIG. 3). In some embodiments, the interaction point may be a point on the active vehicle surface that the user is gesturing, pointing, and/or looking to (e.g., as shown by user action 426 of FIG. 4B).

In some embodiments, steps 1114 and 1116 are performed by the control circuitry (e.g., SFPU 916 of control circuitry 904 and/or SFPU 944 of control circuitry 934 as shown in FIG. 9) generating a spatial mapping (e.g., such as image 210 of FIG. 2). Using the spatial map, control circuitry may easily identify physical objects around the vehicle and use any of the above-mentioned detection methods to determine whether an object corresponds to a user performing a user action. After a user object is determined to be a user action, the control circuitry can calculate the location of the user action based on the coordinate system of the spatial map.

Process 1100 then continues to 1118, where control circuitry (e.g., control circuitry 904 of FIG. 9) takes the determined interaction point location to compare it to a set of stored color cell locations. The control circuitry then subsequently matches the interaction point location to an equivalent stored color cell location and therefore determines which color cells the user interacted with.

In some embodiments, the color cell locations may be stored in reference to the same coordinate system used by the generated spatial mapping (e.g., as described by FIG. 4A). This allows the control circuitry (e.g., the CPU of control circuitry 904 of FIG. 9) to make a one-to-one match between the determined interaction point location and the stored color cell location, since both locations are set in the same coordinate system. In some embodiments, the color cell locations may be stored with respect to a reference point on the vehicle (e.g., as described by FIG. 4B). This allows the control circuitry to identify the reference point in the spatial map to then determine the location of the interaction point with respect to the reference point and subsequently match it to a stored cell location.

At step 1120 of process 1100, control circuitry (e.g., control circuitry 904 of FIG. 9) may determine whether it has received a color selection and determined a color cell that the user interacted with. If both conditions are not satisfied the process reperforms step 1120 to redetermine whether the process has both received a color selection and determined a color cell. Therefore, the process involves continuously monitoring for both conditions to be met during color programming mode to continue to step 1122. If both conditions are satisfied, process 1100 continues to step 1122.

If control circuitry has received a color selection and determined a color cell to program, control circuitry (e.g., control circuitry 904 of FIG. 9) executes step 1122 and programs the determined color cell to the selected color. In some embodiments, control circuitry comprises an vehicle's active surface controller (e.g., active surface controller 906 of FIG. 9) responsible for programming certain color cells to selected colors.

Process 1100 then continues to step 1124, where control circuitry (e.g., control circuitry 904 of FIG. 9) determines whether there are any unprogrammed color cells remaining. In some embodiments, control circuitry comprises an active surface controller (e.g., active surface controller 906 of FIG. 9) that programs a color and/or animation of a programming pattern on unprogrammed cells to indicate to the user the location of said color cells (e.g., a grid pattern as shown on color cell 116 of FIG. 1A). In some approaches, the programming pattern may be a color pattern, animated pattern, a blank color, any other suitable pattern, or any combination thereof. Once the user has programmed certain color cells, the vehicle's active surface controller removes the color and/or animation of the programming pattern from the programmed cells. Thus, in some approaches, the vehicle's active surface controller determines whether there are any unprogrammed color cells remaining by checking if there are any color cells still displaying the color and/or animation of the programming pattern. If the vehicle's active surface controller finds color cells that are still unprogrammed, process 1100 reverts back to step 1112 to monitor for the next user action. If the vehicle's active surface controller determines that no unprogrammed color cells remain, this indicates that the user has completed their customization of the active vehicle surface and process 1100 ends. In some embodiments, process 1100 reverts back to step 1112 even if all cells have been programmed with a color, to allow the user to continue making adjustments. In such embodiments, process 1100 may be ended based on receiving a termination request of color programming mode such as the user performing a specific gesture or pressing a specific button (e.g., by pressing exit icon 524 of FIG. 5 on a user device or by pressing exit icon 612 of FIG. 6 on the active vehicle surface).

In some embodiments, prior to ending process 1100, the control circuitry or a system connected to the control circuitry (e.g., user devices 1004, 1008, 1010 and/or server 1012 of FIG. 10) may analyze the color pattern programmed by the user to detect illegal or unauthorized patterns such as written profanity, violence or other graphic elements, or the use of brands or other commercial patterns that may not be authorized by their owners, and rejects the configuration if the detection is positive. In some embodiments, the detection of illegal and/or unauthorized patterns may happen on the user's user device by capturing images of the vehicle color patterns and performing the same analysis on the user device or a system connected to the user device. Once the configuration is validated, the vehicle's active surface controller may be provided with a digital certificate authorizing the color configuration for use.

Figure 12:
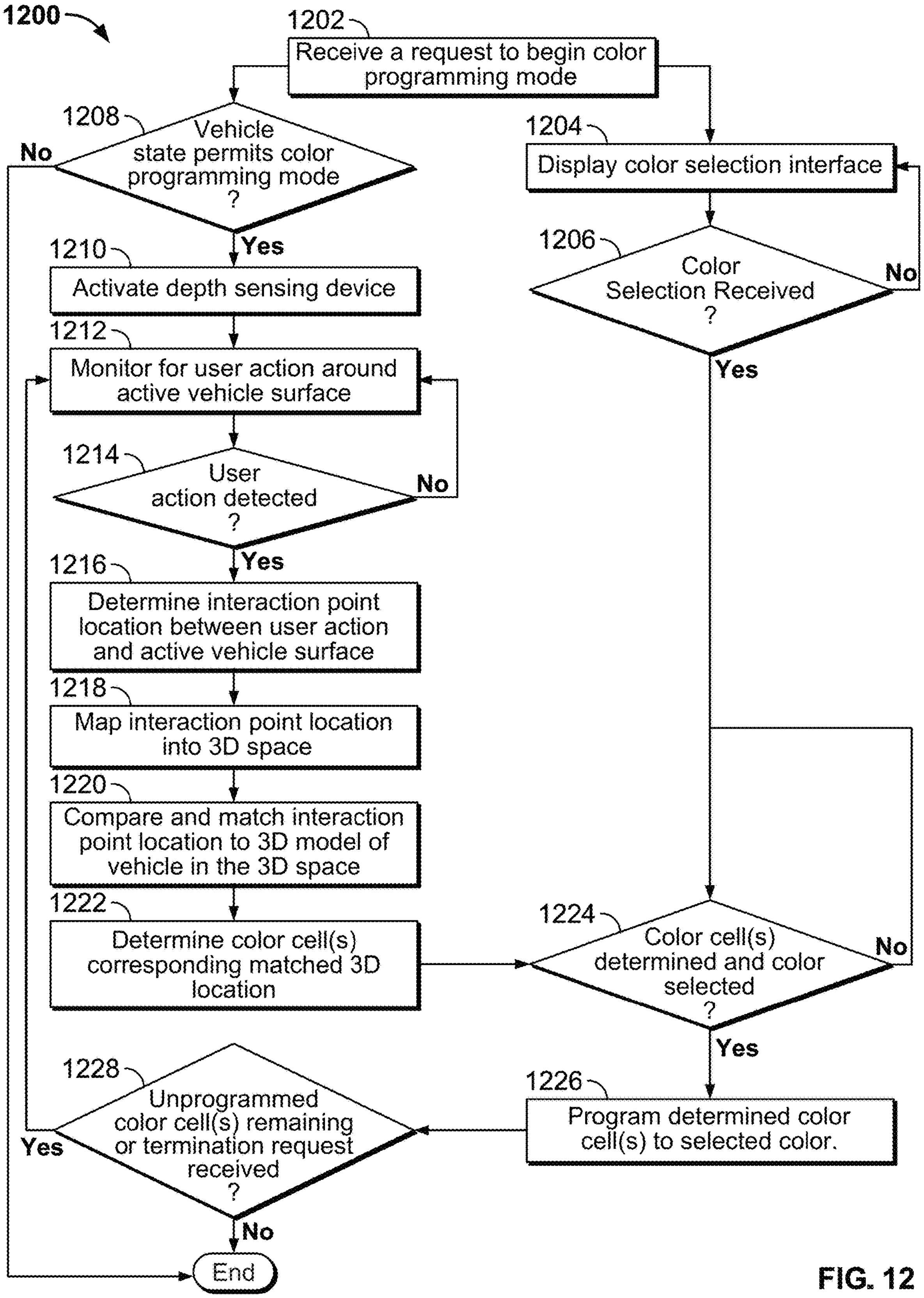
FIG. 12 is an illustrative flowchart for a process for modifying the color of the active vehicle surface, in accordance with embodiments of the disclosure.

FIG. 12 is an illustrative flowchart for a process for modifying the color of the active vehicle surface, in accordance with embodiments of the disclosure. In various embodiments, the individual steps of process 1200 may be implemented by one or more components of the devices and systems of FIGS. 1-10. Although the present disclosure may describe certain steps of process 1200 (and of other processes described herein) as being implemented by certain components of the devices and systems of FIGS. 1-10, this is for purposes of illustration only, and it should be understood that other components of the devices and systems of FIGS. 1-10 may implement those steps instead.

Process 1200 begins at step 1202, where control circuitry (e.g., control circuitry 904 of FIG. 9), receives a request to begin color programming mode on an active vehicle surface (e.g., active vehicle surface 926 of FIG. 9). A request to begin color programming mode may be prompted by similar embodiments outlined in the description of step 1102 of FIG. 11, i.e., receiving the request due to the user launching the color programming application (e.g., an interface of the color programming mode demonstrated by user interface 500) or the user performing a user action towards the vehicle surface. After receiving the request to begin color programming mode, process 1200 continues to steps 1204 and 1208.

In step 1204, control circuitry (e.g., control circuitry 904 of FIG. 9) displays (e.g., on display 918 and/or display 946 of FIG. 9) the color selection interface. The color selection interface may be configured and displayed based on the same embodiments outlined above in the description of steps 1104 and 1106. These embodiments may include displaying the color selection interface on a device (e.g., user device 810 of FIG. 8), running the color programming application and/or displaying the color selection interface directly on the active vehicle surface (e.g., as depicted on vehicle panel 600 of FIG. 6). At step 1206, the control circuitry determines whether a color selection has been received, e.g., by the user selecting a color from color selection interface 504 of FIG. 5 or color selection interface 602 of FIG. 6. If the control circuitry has not received a color selection, it continues to perform step 1204 and displays the color selection interface.

During the execution of process 1204 and 1206, control circuitry (e.g., control circuitry 904 of FIG. 9) concurrently performs step 1208 and determines whether the vehicle's current operation state permits color programming mode. For example, if the vehicle's operation mode is currently in drive mode, the color programming mode may not be activated to prevent endangering the user. Similar to step 1104 of FIG. 11, step 1204 may end if the vehicle is in an operation mode that prevents color programming mode and may begin again at step 1202 when a user re-requests the vehicle to begin color programming mode. In some approaches, control circuitry may display a prompt instructing the user to change the vehicle's operation mode to enable process 1200 to continue. In some embodiments, an operation mode like parked mode or power off mode is designated as a vehicle operation state that permits color programming mode.

If the vehicle is in an operation mode that permits color programming mode, process 1200 continues to step 1210. In step 1210, control circuitry (e.g., control circuitry 904 of FIG. 9) activates a depth-sensing device (e.g., a system comprising sensor(s) 930, 956 and camera(s) 928, 954). Step 1210 may follow the same embodiments as step 1110 of FIG. 11, i.e., the depth-sensing device may be implemented on the vehicle as shown by monitoring system 310 of FIG. 3, or the depth-sensing device may be implemented on a user device as shown by the monitoring system of FIG. 4B represented by sensors 420, 422 of an XR device. In some embodiments, the depth-sensing device may be a set of optical sensors (e.g., cameras, LIDAR, etc.), proximity sensors, IR sensors, motion sensors, ultrasonic sensors, any other suitable sensor, or any combination thereof.

After activating the depth-sensing device, process 1200 continues to step 1212, where control circuitry (e.g., control circuitry 904 of FIG. 9) utilizes the depth-sensing device (e.g., a system comprising sensor(s) 930, 956 and camera(s) 928, 954) to monitor for a user action around the active vehicle surface. As described in process 1100 of FIG. 11, the depth-sensing device may monitor for a user touching a portion of the active vehicle surface (e.g., as shown by user action 204 of FIG. 2 and user action 306 of FIG. 3), a user pointing, gesturing, or looking at the vehicle surface, any other suitable action, or any combination thereof.

At step 1214, control circuitry (e.g., control circuitry 904 of FIG. 9) determines whether the depth-sensing device (e.g., a system comprising sensor(s) 930, 956 and camera(s) 928, 954) has detected a user action. In some embodiments, control circuitry (e.g., GPUs 914, 942 and/or SFPUs 916, 944 of control circuitry 904, 934 respectively, as shown in FIG. 9 may use gesture detection, face detection, object detection, or any combination thereof to detect a user action. If no user action has been detected by the depth-sensing device, process 1200 reverts back to step 1212 and continues to monitor for a user action.

If the depth-sensing device detects a user action, process 1200 proceeds to step 1216. In step 1216, control circuitry (e.g., control circuitry 904 of FIG. 9) determines a location of the interaction point between the user action and the active vehicle surface. As described in step 1116 of FIG. 11, embodiments of the interaction point may include a point where the user touches the active vehicle surface, e.g., by the user pressing a finger or hand against the active vehicle surface (e.g., as shown by user action 204 of FIG. 2 and user action 306 of FIG. 3), or a point on the active vehicle surface that the user is gesturing, pointing, and/or looking to (e.g., as shown by user action 426 of FIG. 4B).

Process 1200 then continues to step 1218 where control circuitry (e.g., control circuitry 904 of FIG. 9) maps the interaction point location into 3D space. In some embodiments, control circuitry (e.g., SFPU 916 of control circuitry 904 and/or SFPU 944 of control circuitry 934 as shown in FIG. 9) calculates the location of the interaction point with respect to a coordinate system used by the depth-sensing device to measure the space around the vehicle. In some embodiments, control circuitry (e.g., GPU 914 of control circuitry 904 and/or GPU 942 of control circuitry 934 of FIG. 9) maps the interaction point location into a coordinate system at the same scale as the real-world environment of the vehicle. In some approaches, the control circuitry maps the interaction point location into a coordinate system that has been scaled up or down with respect to the real-world environment. In such embodiments, mapping the location into the 3D space may comprise performing a scaling transformation on the location coordinates.

At step 1120, after mapping the interaction point location into 3D space, control circuitry (e.g., control circuitry 904 of FIG. 9) may compare the mapped location to a 3D model of the vehicle that has been generated into the same 3D space with the same origin point and equivalent scaling. For example, if the interaction point location is mapped to $(x_1,y_1,z_1)$ in the 3D space, control circuitry compares that location to the surface of the 3D model to determine which part of the vehicle matches the location $(x_1,y_1,z_1)$. When the control circuitry matches the mapped interaction point location to a spot on the vehicle model, the control circuitry can discern that this is where a color cell needs to be programmed.

Process 1200 then continues to step 1222, where control circuitry (e.g., control circuitry 904 of FIG. 9) determines one or more color cells corresponding to the matched 3D location. In some embodiments, the vehicle 3D model may include a data structure assigning each color cell to a set of coordinates in the 3D space. By referencing the data structure of assigned color cell coordinates, the control circuitry (e.g., CPU 912 of control circuitry 904 of FIG. 9) may determine that coordinates of the vehicle model correspond to a specific color cell.

In step 1224, control circuitry (e.g., control circuitry 904 of FIG. 9) determines whether it has determined one or more color cells and whether it has received a color selection. If both conditions are not satisfied the process reperforms step 1224 to redetermine whether the process has both received a color selection and determined a color cell. Therefore, the process involves continuously monitoring for both conditions to be met during color programming mode to continue to step 1226. If both conditions are satisfied, process 1200 continues to step 1226, where control circuitry (e.g., active surface controller 906 of FIG. 9) programs the determined color cell to the selected color.

Process 1200 then continues to step 1228, where control circuitry (e.g., control circuitry 904 of FIG. 9) determines whether there are any unprogrammed color cells remaining. In some embodiments, control circuitry comprises an active surface controller (e.g., active surface controller 906 of FIG. 9), which programs a color and/or animation of the programming pattern on unprogrammed cells to indicate to the user the location of said color cells (e.g., a grid pattern as shown on color cell 116 of FIG. 1A). As outlined in the description of step 1124, the active vehicle surface may set a programming pattern on the active vehicle surface to facilitate determining if unprogrammed color cells remain. If the vehicle's active surface controller finds color cells that are still unprogrammed, process 1200 reverts back to step 1212 to monitor for the next user action. If the vehicle's active surface controller determines that no unprogrammed color cells remain, this indicates that the user has completed their customization of the active vehicle surface and process 1200 ends. In some embodiments, process 1200 reverts back to step 1212 even if all cells have been programmed with a color, to allow the user to continue making adjustments. In such embodiments, process 1200 may be ended based on receiving a termination request of color programming mode such as on the user performing a specific gesture or pressing a specific button (e.g., by pressing exit icon 524 of FIG. 5 on a user device or by pressing exit icon 612 of FIG. 6 on the active vehicle surface).

Figure 13:
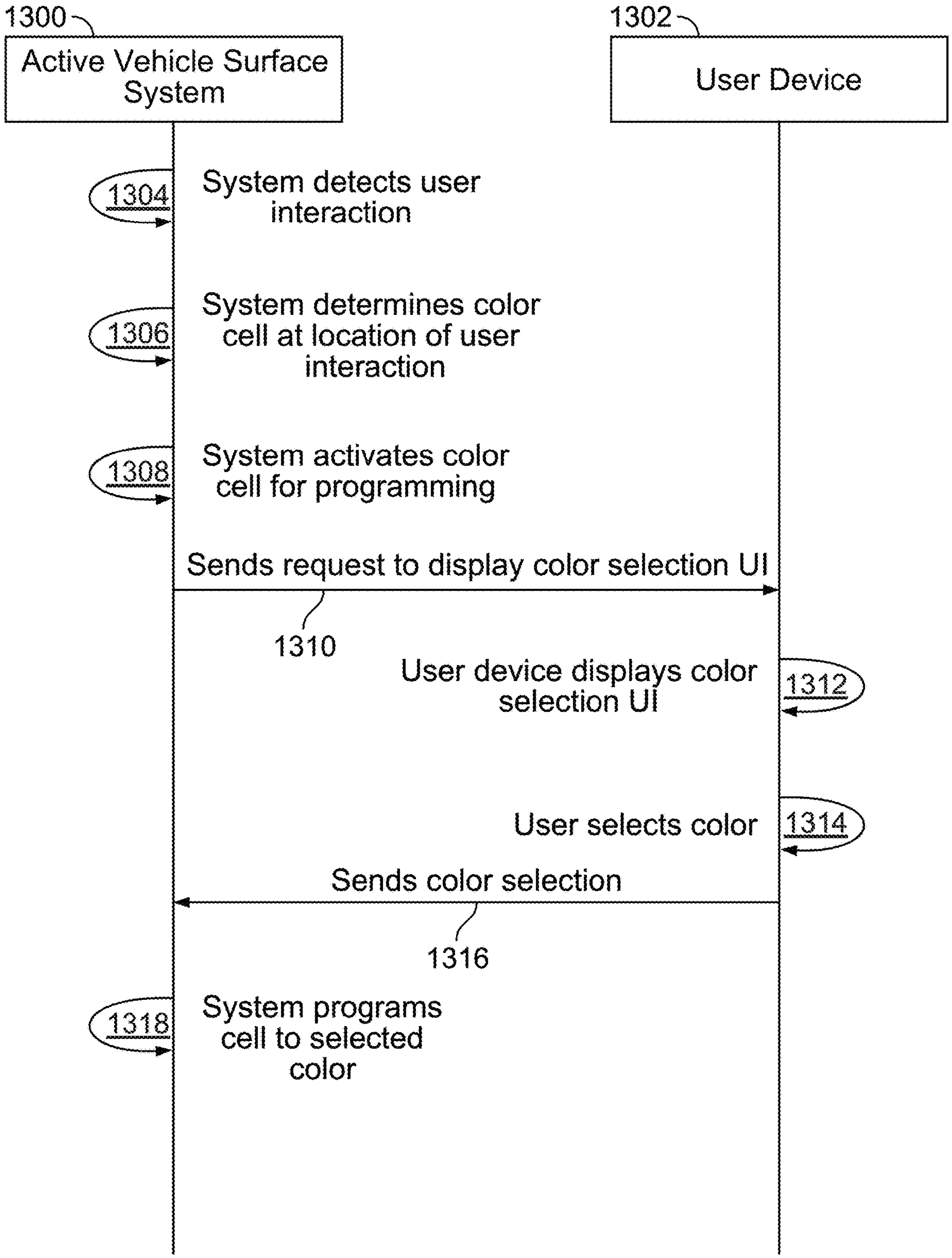
FIG. 13 is a sequence diagram showing the transfer of instructions between the vehicle's active surface controller and user device to program a color cell, in accordance with embodiments of the disclosure.

FIG. 13 is a sequence diagram showing the transfer of instructions between the active vehicle surface system and a user device to program a color cell, in accordance with embodiments of the disclosure. Active vehicle surface system 1300 (running on control circuitry 904 and/or control circuitry 934 of FIG. 9) detects, at 1304, a user interaction. For example, the system may comprise a monitoring system (e.g., made up of sensor(s) 930, 956 and camera(s) 928, 954 of FIG. 9) and detects that a user has touched the surface of the vehicle. At 1306, the active vehicle surface system determines the color cell that is located at the user interaction. The system may use the techniques and processes described in FIGS. 2-4A, 11-12 to make the determination. At 1308, the system subsequently activates the color cell for programming. For example, the vehicle's active surface controller (e.g., active surface controller 906 of FIG. 9) may activate the cell by programming it to display a programming indicator.

With the color cell now activated, the active vehicle surface system sends a request to display a color selection user interface to user device 1302 at 1310. User device 1302 may be a mobile computing device, an XR device, a system integrated into the vehicle, any other suitable user device, or any combination thereof. In some embodiments, the user device is running a color programming application that displays the color selection user interface. In some approaches, when the system sends the request to display the color selection user interface to the user device, the request may also include the vehicle's capabilities in terms of color rendering, such as the number of colors it can render along with the chromatic coordinates for the colors that can be rendered. The information about the vehicle's capabilities may also be directly available in the color programming application by the user selecting the vehicle model and subsequently downloading the capabilities from a server (e.g., server 1012 of FIG. 10) such as the manufacturer database.

At 1312, in response to receiving the request, user device 1302 displays the color selection user interface (e.g., color selection interface 504 of FIG. 5 or color selection interface 602 of FIG. 6). As indicated above, the color selection interface may be displayed on user device 1302 by running a color programming application. At 1314, the user subsequently selects a color from the color options presented by the color selection user interface. In response to receiving the user's color selection, at 1316, user device 1302 transmits the color selection back to active vehicle surface system 1300. The active vehicle surface system takes the color selection and programs the determined color cell to the selected color, at 1318.

Figure 14:
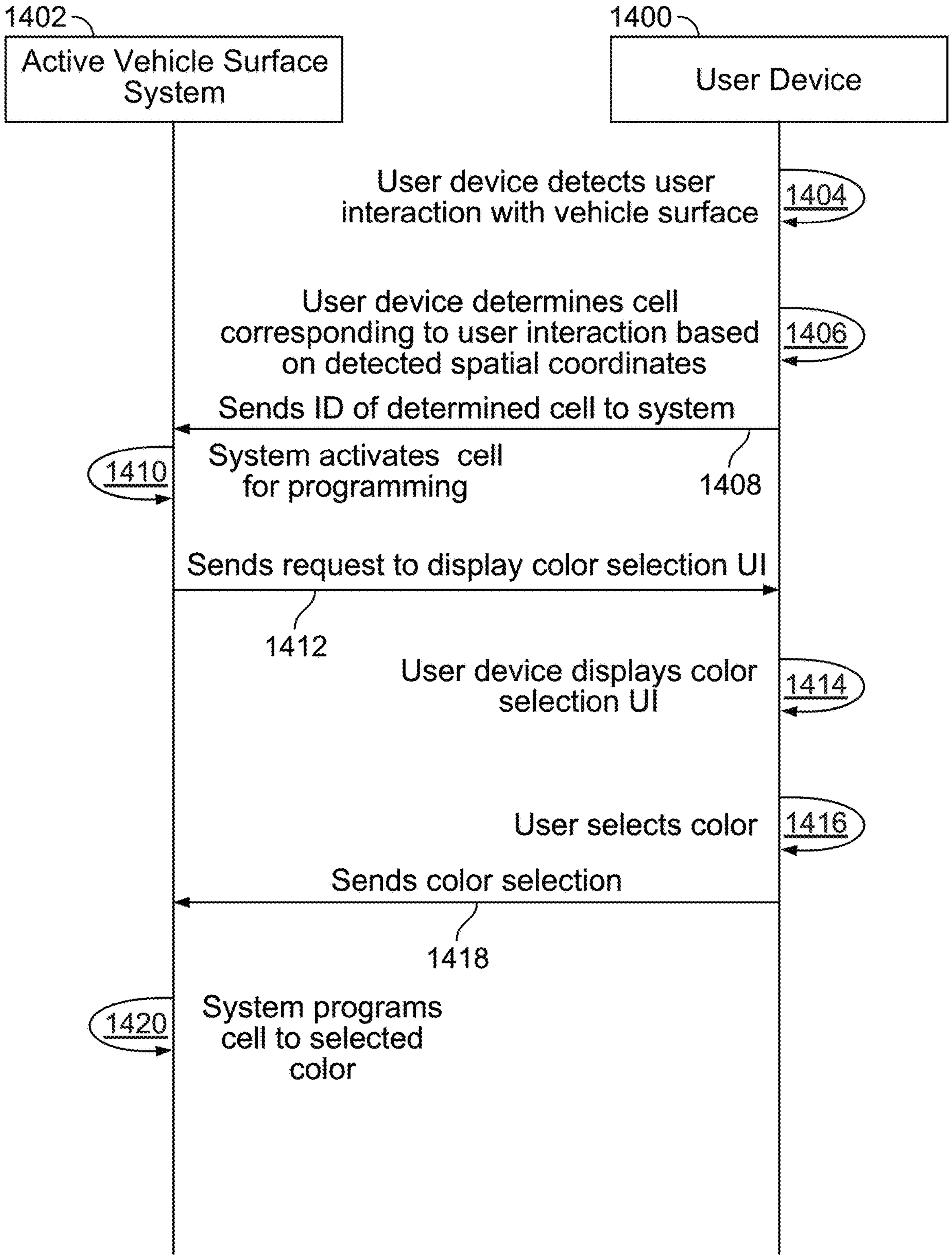
FIG. 14 is a sequence diagram showing the transfer of instructions between the vehicle's active surface controller and user device to program a color cell, in accordance with embodiments of the disclosure.

FIG. 14 is a sequence diagram showing the transfer of instructions between the active vehicle surface system and user device to program a color cell, in accordance with embodiments of the disclosure. User device 1400 (running on control circuitry 904 and/or control circuitry 934 of FIG. 9) detects, at 1404, a user interaction. For example, the system may comprise a monitoring system (e.g., made up of sensor(s) 930, 956 and camera(s) 928, 954 of FIG. 9) and detects that a user has touched the surface of the vehicle. User device 1400 may be a mobile computing device, an XR device, a system integrated into the vehicle, any other suitable user device, or any combination thereof. At 1406, the active vehicle surface system determines the color cell that is located at the user interaction. The system may use the techniques and processes described in FIGS. 2, 3, 4B, 11-12 to make the determination. User device 1400 then sends, at 1408, an indication (e.g., a cell ID) of the determined cell to active vehicle surface system 1402. In some embodiments, active vehicle surface system 1402 comprises an active surface controller (e.g., active surface controller 906 of FIG. 9). In response to receiving the indication, at 1410 the vehicle's active surface controller activates the determined cell for programming. For example, the vehicle's active surface controller may activate the cell by programming it to display a programming indicator.

After the determined cell has been activated, at 1412 the active vehicle surface system sends a request to display a color selection user interface at user device 1400. As outlined in the description of FIG. 13, the request may also include the vehicle's capabilities in terms of color rendering such as the number of colors it can render along with the chromatic coordinates for the colors that can be rendered. The information about the vehicle's capabilities may also be directly available in the color programming application by the user selecting the vehicle model and subsequently downloading the capabilities from a server (e.g., server 1012 of FIG. 10) such as the manufacturer database. At 1414, user device 1400 displays the color selection user interface (e.g., color selection interface 504 of FIG. 5 or color selection interface 602 of FIG. 6). In some embodiments, the user device is running a color programming application that displays the color selection user interface.

At 1416, the user selects a color from the color options presented by the color selection user interface. In response to receiving the user's color selection, at 1418, user device 1400 transmits the color selection back to active vehicle surface system 1402. The active vehicle surface system takes the color selection and subsequently programs the determined color cell to the selected color, at 1420.

The embodiments discussed above are intended to be illustrative and not limiting. Only the claims that follow are meant to set bounds as to what the present invention includes. Furthermore, it should be noted that the feature and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also not be noted that the systems and/or methods described above may be applied to, or used in accordance with, other systems and/or methods.

What is claimed is:

1. A method for changing an exterior color configuration of an exterior surface of a vehicle, the method comprising:

receiving a request to activate a color programming mode on the vehicle;

determining whether a current operation state of the vehicle permits activation of the color programming mode;

based at least in part on determining that the current operation state of the vehicle permits activation, activating the color programming mode on the vehicle, wherein the activating color programming mode comprises enabling the vehicle to receive requests from a client device to change the exterior surface of the vehicle;

receiving a request from the client device to change at least a portion of the exterior surface of the vehicle to a selected color configuration; and based at least in part on the received request, changing at least the portion of the exterior surface of the vehicle to the selected color configuration.

2. The method of claim 1, wherein the current operation state is at least one of a parked state, a power-off state, or a neutral state.

3. The method of claim 1, wherein the request to activate the color programming mode is a first request received at a first time, the method further comprising:

receiving a second request, at a second time, to activate the color programming mode on the vehicle;

determining whether a current operation state of the vehicle at the second time permits activation of the color programming mode;

based at least in part on determining that the current operation state of the vehicle at the second time does not permit activation, generating for display a message indicating that the color programming mode cannot be activated.

4. The method of claim 3, wherein the message is displayed on at least one of:

an infotainment display of the vehicle or the client device.

5. The method of claim 1, further comprising:

receiving a request to save the selected color configuration; and based at least in part on receiving the request to save the selected color configuration:

storing the selected color configuration at the vehicle; or causing the selected color configuration to be stored at a server associated with the vehicle.

6. The method of claim 1, wherein the selected color configuration is at least one of:

a color corresponding to at least the portion of the exterior surface, a color of one or more electronically programmable color cells of a plurality of electronically programmable color cells of the exterior surface, or a pattern of at least the portion of the exterior surface.

7. The method of claim 1, further comprising:

receiving a request to switch to an operation state that is incompatible with the color programming mode; and based at least in part on receiving the request to switch to the operation state that is incompatible with the color programming mode, ending the color programming mode on the vehicle.

8. The method of claim 1, further comprising:

receiving a request to switch to an operation state that is incompatible with the color programming mode; and based at least in part on receiving the request to switch to the operation state that is incompatible with the color programming mode, continuing to maintain the selected color configuration on the exterior surface of the vehicle.

9. The method of claim 1, wherein a color configuration of at least the portion of the exterior surface prior to activating the color programming mode is an initial color configuration, the method further comprising:

receiving a request to switch to an operation state that is incompatible with the color programming mode; and based at least in part on receiving the request to switch to the operation state that is incompatible with the color programming mode, ending the color programming mode on the vehicle and changing at least the portion of the exterior surface of the vehicle to the initial color configuration.

10. The method of claim 1, wherein the client device is a mobile device running a color programming application configured to receive an input corresponding to changing at least the portion of the exterior surface of the vehicle to the selected color configuration, and wherein the mobile device is distinct from and communicatively coupled to the vehicle.

11. A system for changing an exterior color configuration of an exterior surface of a vehicle, the system comprising:

input/output circuitry configured to:

receive a request to activate a color programming mode on the vehicle; and control circuitry configured to:

determine whether a current operation state of the vehicle permits activation of the color programming mode;

based at least in part on determining that the current operation state of the vehicle permits activation, activate the color programming mode on the vehicle, wherein the activating color programming mode comprises enabling the vehicle to receive requests from a client device to change the exterior surface of the vehicle; and wherein the input/output circuitry is further configured to:

receive a request from the client device to change at least a portion of the exterior surface of the vehicle to a selected color configuration; and wherein the control circuitry is further configured to:

based at least in part on the received request, change at least the portion of the exterior surface of the vehicle to the selected color configuration.

12. The system of claim 11, wherein the current operation state is at least one of a parked state, a power-off state, or a neutral state.

13. The system of claim 11, wherein the request to activate the color programming mode is a first request received at a first time, and wherein:

the input/output circuitry is further configured to:

receive a second request, at a second time, to activate the color programming mode on the vehicle; and the control circuitry is further configured to:

determine whether a current operation state of the vehicle at the second time permits activation of the color programming mode;

based at least in part on determining that the current operation state of the vehicle at the second time does not permit activation, generate for display a message indicating that the color programming mode cannot be activated.

14. The system of claim 13, wherein the message is displayed on at least one of:

an infotainment display of the vehicle or the client device.

15. The system of claim 11, wherein:

the input/output circuitry is further configured to:

receive a request to save the selected color configuration; and the control circuitry is further configured to:

based at least in part on receiving the request to save the selected color configuration:

store the selected color configuration at the vehicle; or cause the selected color configuration to be stored at a server associated with the vehicle.

16. The system of claim 11, wherein the selected color configuration is at least one of:

a color corresponding to at least the portion of the exterior surface, a color of one or more electronically programmable color cells of a plurality of electronically programmable color cells of the exterior surface, or a pattern of at least the portion of the exterior surface.

17. The system of claim 11, wherein:

the input/output circuitry is further configured to:

receive a request to switch to an operation state that is incompatible with the color programming mode; and the control circuitry is further configured to:

based at least in part on receiving the request to switch to the operation state that is incompatible with the color programming mode, end the color programming mode on the vehicle.

18. The system of claim 11, wherein:

the input/output circuitry is further configured to:

receive a request to switch to an operation state that is incompatible with the color programming mode; and the control circuitry is further configured to:

based at least in part on receiving the request to switch to the operation state that is incompatible with the color programming mode, continue to maintain the selected color configuration on the exterior surface of the vehicle.

19. The system of claim 11, wherein a color configuration of at least the portion of the exterior surface prior to activating the color programming mode is an initial color configuration, and wherein:

the input/output circuitry is further configured to:

receive a request to switch to an operation state that is incompatible with the color programming mode; and the control circuitry is further configured to:

based at least in part on receiving the request to switch to the operation state that is incompatible with the color programming mode, end the color programming mode on the vehicle and changing at least the portion of the exterior surface of the vehicle to the initial color configuration.

20. The system of claim 11, wherein the client device is a mobile device running a color programming application configured to receive an input corresponding to changing at least the portion of the exterior surface of the vehicle to the selected color configuration, and wherein the mobile device is distinct from and communicatively coupled to the vehicle.

* * * * *